US009955505B2

(12) United States Patent
Vandwalle et al.

(10) Patent No.: US 9,955,505 B2
(45) Date of Patent: Apr. 24, 2018

(54) PEER-TO-PEER COMMUNICATIONS ON RESTRICTED CHANNELS

(71) Applicant: Apple Inc., Cupertino, CA (US)

(72) Inventors: Pierre B. Vandwalle, San Francisco, CA (US); Christiaan A. Hartman, San Jose, CA (US); Peter M. Agboh, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 139 days.

(21) Appl. No.: 14/099,762

(22) Filed: Dec. 6, 2013

(65) Prior Publication Data

US 2015/0163828 A1 Jun. 11, 2015

(51) Int. Cl.
*H04W 4/00* (2009.01)
*H04W 74/08* (2009.01)
*H04W 28/04* (2009.01)
*H04W 52/38* (2009.01)
(Continued)

(52) U.S. Cl.
CPC ..... *H04W 74/0833* (2013.01); *H04W 28/044* (2013.01); *H04W 52/0216* (2013.01); *H04W 52/0229* (2013.01); *H04W 52/383* (2013.01); *H04W 74/085* (2013.01);
(Continued)

(58) Field of Classification Search
CPC ............. H04W 72/0446; H04W 88/08; H04W 72/0453
See application file for complete search history.

(56) References Cited

U.S. PATENT DOCUMENTS

| 8,335,937 B2 | 12/2012 | Qi et al. |
| 2002/0188723 A1* | 12/2002 | Choi ............... H04W 36/06 709/225 |

(Continued)

FOREIGN PATENT DOCUMENTS

| JP | 2009-302874 A | 12/2009 |
| JP | 2013-509140 A | 3/2013 |

(Continued)

OTHER PUBLICATIONS

"Understanding Dynamic Frequency Selection," Cisco Systems Inc., OL-11491-03 (2008); 6 pages.

*Primary Examiner* — Siren Wei
(74) *Attorney, Agent, or Firm* — Sterne, Kessler, Goldstein & Fox, PLLC

(57) ABSTRACT

A method and apparatus are provided for conducting peer-to-peer communications while channel hopping among two or more wireless channels, at least one of which is a restricted channel. One type of restricted channel requires the use of DFS (Dynamic Frequency Selection) or a similar scheme for avoiding use of the channel during certain circumstances (e.g., for radar avoidance). Communicating peers may synchronize a channel-hopping sequence with TBTTs (Target Beacon Transmission Times) of the restricted channel(s), so that they switch to such a channel in time to capture a beacon and determine whether the channel is free. If the channel is free, or if no beacon is received, they may immediately begin or resume their communications. They may also quiesce just before another TBTT so as to capture that beacon. Thus, the peer-to-peer communications do not diminish a peer device's ability to receive and comply with channel switch announcements.

19 Claims, 11 Drawing Sheets

(51) Int. Cl.
*H04W 76/02* (2009.01)
*H04W 52/02* (2009.01)

(52) U.S. Cl.
CPC ..... *H04W 74/0808* (2013.01); *H04W 76/023* (2013.01); *H04W 74/0816* (2013.01); *Y02B 60/50* (2013.01)

(56) References Cited

U.S. PATENT DOCUMENTS

| | | | | |
|---|---|---|---|---|
| 2003/0002456 A1* | 1/2003 | Soomro | ............... | H04W 72/02 370/328 |
| 2006/0252418 A1* | 11/2006 | Quinn | .................. | H04W 16/10 455/423 |
| 2007/0149230 A1 | 6/2007 | Song et al. | | |
| 2008/0107156 A1* | 5/2008 | Wentick | ................ | H04B 1/713 375/134 |
| 2009/0310583 A1 | 12/2009 | Suzuki | | |
| 2010/0135256 A1* | 6/2010 | Lee et al. | ...................... | 370/336 |
| 2011/0211219 A1 | 9/2011 | Bradley et al. | | |
| 2011/0305228 A1* | 12/2011 | Cordeiro | ............. | H04W 56/00 370/338 |
| 2013/0039298 A1 | 2/2013 | Park et al. | | |
| 2013/0132500 A1 | 5/2013 | Vandwalle et al. | | |
| 2013/0132501 A1 | 5/2013 | Vandwalle et al. | | |
| 2013/0132502 A1* | 5/2013 | Stacey | .............. | H04W 56/0015 709/208 |
| 2013/0185373 A1 | 7/2013 | Vandwalle et al. | | |
| 2013/0195036 A1* | 8/2013 | Quan | .................... | H04W 72/04 370/329 |
| 2013/0272277 A1 | 10/2013 | Suwa et al. | | |
| 2013/0343198 A1* | 12/2013 | Chhabra | ............... | H04W 48/12 370/242 |
| 2014/0003414 A1* | 1/2014 | Choudhury | ......... | H04W 74/006 370/347 |
| 2014/0362726 A1 | 12/2014 | Vandwalle et al. | | |
| 2015/0351114 A1 | 12/2015 | Wolf et al. | | |

FOREIGN PATENT DOCUMENTS

| | | |
|---|---|---|
| JP | 2014-522196 A | 8/2014 |
| JP | 2015-503885 A | 2/2015 |
| WO | WO 2011/078948 A2 | 6/2011 |
| WO | WO 2013/022293 A2 | 2/2013 |
| WO | WO 2013/106711 A1 | 7/2013 |

* cited by examiner

PEER-TO-PEER COMMUNICATIONS ON RESTRICTED CHANNELS

RELATED ART

The subject matter of the present application is related to subject matter of the following co-pending non-provisional U.S. Patent Applications: (a) application Ser. No. 13/625,752, entitled "Selection of a Master in a Peer-to-Peer Network Environment" and filed 24 Sep. 2012; (b) application Ser. No. 13/625,766, entitled "Synchronization of Devices in a Peer-to-Peer Network Environment" and filed 24 Sep. 2012; (c) application Ser. No. 13/657,707, entitled "Selection of Synchronization Stations in a Peer-to-Peer Network Environment" and filed 22 Oct. 2012; (d) application Ser. No. 13/736,725, entitled "Group Formation Within a Synchronized Hierarchy of Peer-to-Peer Devices" and filed 8 Jan. 2013; and (e) application Ser. No. 13/913,278, entitled "Method and Apparatus for Cooperative Channel Switching" and filed 7 Jun. 2013.

BACKGROUND

This disclosure relates to the field of data communications. More particularly, methods and apparatus are provided for conducting peer-to-peer communications on a restricted communication channel.

Wireless communications have many benefits, for both data and voice, but are not without restrictions. For example, in the United States, consumer use of radio frequency ranges 5.25-5.35 GHz and 5.47-5.725 GHz is not permitted to interfere with certain types of radar systems (e.g., Doppler weather radar). Upon detection of a signal indicative of a protected radar system, any device configured or configurable to use a restricted range must automatically and quickly switch to a channel that does not interfere.

A Dynamic Frequency Selection (DFS) algorithm is often used to facilitate frequency changes. Even in unrestricted frequency bands, DFS is used to allow radio devices (e.g., wireless access points) to automatically choose one of multiple frequency channels, usually to avoid interference or congestion on other channels.

However, applying DFS within a peer-to-peer communication environment to comply with channel restrictions has been impossible, or at least difficult, when communicating peers are connected to different access points. For example, when two peer devices are communicating directly and one of them is required by its access point to change away from its current (restricted) channel, the peer-to-peer communications may be disrupted, especially if the change conflicts with a series of channel changes already scheduled for the devices.

SUMMARY

In some embodiments, methods and apparatus are provided for conducting peer-to-peer communications while channel hopping among two or more wireless channels, at least one of which is a restricted channel. In these embodiments, a restricted channel is a channel that requires deference to a preferred signal source or type of signal. An exemplary restricted channel is one that requires the use of DFS (Dynamic Frequency Selection) or a similar scheme for radar avoidance or to avoid interfering with some other type of signal.

In some embodiments, communicating peers synchronously hop among multiple channels, and align their hops to restricted channels with TBTTs (Target Beacon Transmission Times) of access points or DFS masters operating on the channels. For example, each channel-hopping sequence may begin on a restricted channel, and they may tune to that channel very near a TBTT (e.g., a few milliseconds prior). They are then silent in order to avoid transmitting illegally and to facilitate detection of the beacon. They may also quiesce shortly before TBTT if they were already communicating on the restricted channel (i.e., instead of having just hopped to the channel).

If the beacon indicates the channel is free, they may immediately begin or resume their communications. Otherwise, they comply with any channel switch announcement or other directive they detect. The quiet period around TBTT ensures that the peer-to-peer frames do not collide with or delay transmission of a beacon. Thus, the peer-to-peer communications do not diminish a peer device's ability to receive and comply with channel avoidance announcements.

Communicating peer devices may align their channel hops with beacons of multiple restricted channel and/or some other channel (e.g., another infrastructure channel, a social channel) that they tune to in order to maintain contact with another access point or to maintain synchronization with a collection of other peer devices. Depending on beacon intervals on the various channels, peer devices may have to dynamically determine the length of time they dwell on a particular channel, not only to return to a "base" channel (e.g., a restricted channel) at the start of a channel-hopping sequence period, but also to capture (or permit a peer to issue) a beacon.

DETAILED DESCRIPTION

Figure 1:
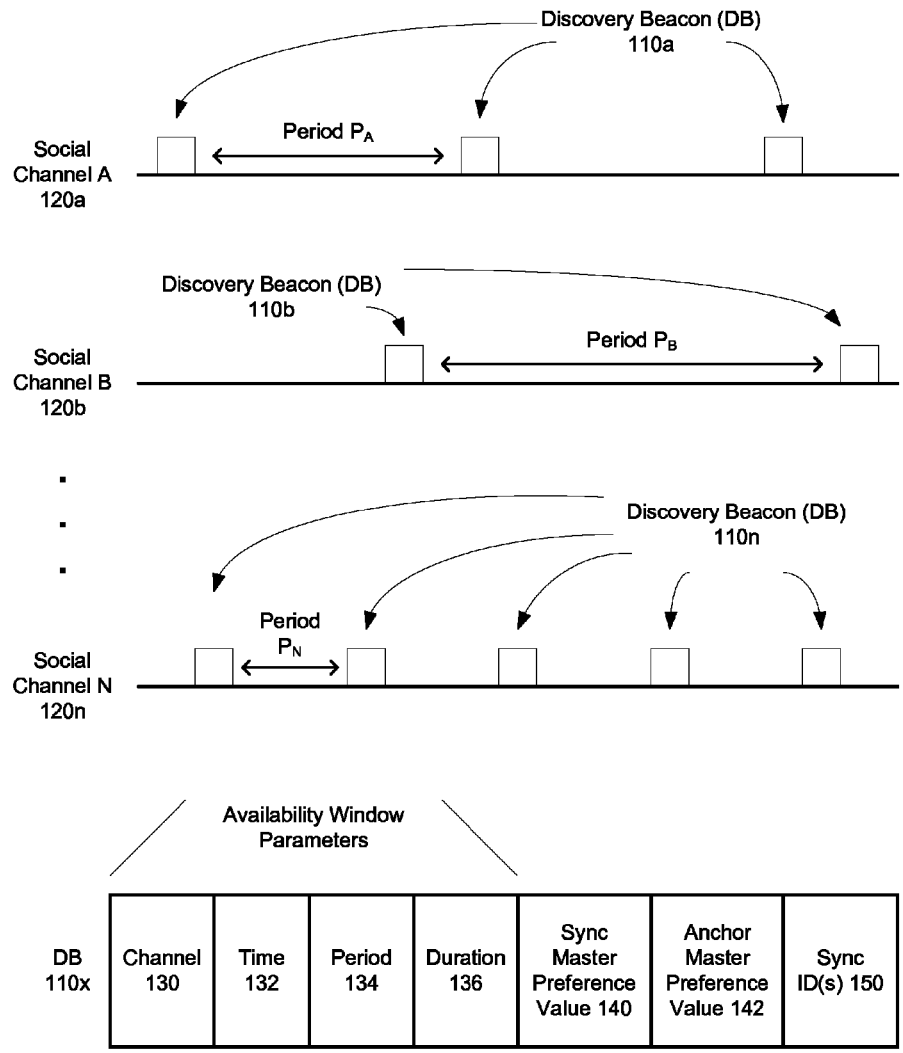
FIG. 1 depicts the use of discovery beacons for achieving and maintaining synchronization among cluster devices, in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, this disclosure is not intended to be limited to the embodiments shown, but rather is to be accorded the widest scope consistent with the following description.

In some embodiments, methods and apparatus are provided for performing peer-to-peer wireless communications on restricted channels. The described embodiments are suitable for use within restricted portions of the 5 GHz radio frequency band—such as those frequency ranges allocated to the Unlicensed National Information Infrastructure (U-NII-2, U-NII-2e, and U-NII-3), from which devices are required to exit upon detection of predetermined signals (e.g., weather radar signatures).

In particular, the described embodiments are compatible with DFS (Dynamic Frequency Selection), which is one technology for complying with radar avoidance requirements. Other embodiments for other operating environments and restrictions may be readily developed from the following discussion.

In these embodiments, multiple peer devices synchronously hop among multiple channels, at least one of which is restricted (e.g., by requiring DFS to avoid interfering with a protected signal or emitter). The devices may dynamically calculate their dwell times on different channels (or use fixed-length time slots), and time their hops to allow them to rendezvous with other peer devices, maintain communications with infrastructure nodes, capture various beacons and/or other management frames, etc.

Introduction

A peer-to-peer wireless communication environment may be characterized by any number of devices of the same type and/or different types—such as smart phones, tablets, personal digital assistants, laptop and desktop computers, media devices (e.g. for streaming multi-media content), and so on. Different devices will have different features, may execute different applications, may have different power levels (e.g., battery charges), different communication needs, different loads (e.g., on a processor, on an antenna), may be heard by (or may hear) other devices with varying signal strengths, etc. In addition, the communication environment may be fluid, with devices continuously entering, moving through, and exiting the spatial region encompassing the environment.

Some embodiments disclosed herein enable devices in such an environment to discover each other and to communicate directly, peer-to-peer. These embodiments: promote low power consumption even while making devices and services readily discoverable; coexist with other communication technologies (e.g., Bluetooth®); support multi-band operation (e.g., 2.4 GHz and 5 GHz); avoid the throughput and latency degradation usually encountered with network infrastructure (e.g., access points) while maintaining compatibility with infrastructure-based technologies; easily and quickly recover if and when a device acting as a master exits the environment; are scalable to accommodate dense environments having many devices; and avoid interference with other collections of devices. These and other features and advantages are described below.

In some embodiments, a collection of devices in an environment is synchronized so that they rendezvous at predetermined times on predetermined channels. A synchronized collection of devices may be termed a cluster. A period of time during which devices of a single cluster rendezvous is termed an availability window, and all master devices within the cluster advertise the same schedule of availability windows. During an availability window, peers may exchange multicast and/or unicast data communications, facilitate management or operation of the cluster, and discover other devices and services.

Parameters of one or more upcoming availability windows (e.g., channel, start time, and duration) are communicated via discovery beacons that are broadcast on one or more social channels. In different implementations, different strategies for encountering a beacon may be applied. For example, a device may listen on a given social channel for a continuous period of time sufficient to hear at least one discovery beacon, may periodically listen for short periods of time, etc.

Thus, when a device boots, goes online, or moves into an environment of peer devices, it will tune to a predetermined social channel and quickly learn where and when it may rendezvous with other devices. If the device does not hear a discovery beacon, it may assume that it should act as a master and begin issuing its own discovery beacons to facilitate synchronization with other devices that may be present or that may later appear.

Synchronization parameters (e.g., a schedule of upcoming availability windows) may also be announced during an availability window in some implementations, thereby saving the devices the expense of switching their radios to a social channel to receive the parameters. A device may even power off its radio when not listening for a discovery beacon, participating in an availability window, communicating directly with a peer, or using it for some other purpose.

A device participating in a cluster may therefore share a radio, antenna and/or other communication resource(s) among multiple device functions, such as an infrastructure connection or a Bluetooth® link. However, the communication requirements of the synchronized peer-to-peer environment—such as periodically tuning to a social channel to receive a discovery beacon, attending availability windows on rendezvous channels, and adhering to communication channel restrictions—may conflict with other demands for those resources.

Within a community of peer devices, a selection procedure is applied to determine which devices will become masters and assume responsibility for synchronizing other devices. The number of master devices selected may depend on the number of peer devices present, their signal strengths, signal propagation patterns, operating parameters, etc.

Although devices in the communication environment engage in peer-to-peer communications without the burden of infrastructure requirements, the selection of masters will logically organize the cluster's devices into a hierarchy for purposes of synchronization. Within the hierarchy, an "anchor master" (or top master) is responsible for overall synchronization of the cluster via synchronization parameters conveyed by the discovery beacons it broadcasts. Each subordinate master, called a synchronization (or "sync") master, synchronizes with the anchor master or an intervening sync master, and retransmits or repackages the anchor master's synchronization parameters within its own discovery beacons, thereby extending the range of the overall synchronization. Other devices participating in the hierarchy become non-master devices.

The radio range of a single wireless device (e.g., the anchor master) is limited, which would normally prevent that device from organizing devices beyond a local region. Requiring subordinate masters to rebroadcast its synchronization parameters allows that single wireless device to synchronize a collection of devices spread over a larger area. The entire cluster enjoys the resulting benefits (e.g., ready discovery of services and other devices, less power consumption).

Unlike an environment that has infrastructure requirements (e.g., which require coordination via an access point), because a master's principal task is simply to disseminate rendezvous/synchronization parameters, loss of a master device is easily rectified. For example, the rendezvous schedule published by a missing anchor master device will simply be maintained by the cluster's synchronization masters while a replacement anchor master is chosen, thereby keeping all devices synchronized. And, that replacement will generally maintain the same schedule.

Different algorithms for selecting masters may be applied at different times and/or in different environments, but generally serve to promote any or all of these objectives: even spatial distribution of masters throughout the environment, a tunable density of masters within the environment, and control of the size of the geographic area comprising the environment.

In some embodiments, an algorithm for selecting or identifying masters is executed regularly to ensure the most appropriate devices act as masters, based on various metrics or attributes of the devices. The selection process may also consider how many masters are already present in an area, how many masters a given peer device can hear, how far away they are (e.g., based on signal strength or some other measure of distance), etc.

Some entities addressed in the following description may be known by different terms in other contexts, and therefore the following mapping is provided to identify some alternative terminology, which is not intended to be exhaustive. For example, a generic master device may be called a "synchronization station." The device acting as anchor master may also be known as the "root," the "root master," the "root synchronization station," or the "top master." A synchronization master other than the anchor master may also be known as a "branch synchronization station," a "branch" master or a subordinate master. A non-master device may also be termed a "leaf" device or a "slave." A discovery beacon may alternatively be titled a "Periodic Synchronization Frame" (or PSF), and an availability window may be called a "discovery window." A cluster of devices may alternatively be called a tree, a synchronization tree, or a hierarchy. Other terms introduced below include a "synchronization beacon" that may also be known as a "Master Indication Frame" (or MIF).

Sections that follow discuss synchronization of devices within a peer-to-peer communication environment to form a cluster, cooperative peer-to-peer communications, conducting peer-to-peer communications within a restricted environment, and an illustrative peer device, according to some embodiments.

Synchronization of Devices

As discussed above, synchronization of devices within a wireless communication environment according to some embodiments allows them to easily discover each other, identify available services, and engage in direct peer-to-peer communications (unicast and/or multicast), all while conserving power resources and coexisting with other communication processes.

Synchronization to form a cluster commences as soon as a device comes online or moves within range of at least one other device operating a compatible protocol, and can be maintained as long as the device is online within the spatial area encompassing the synchronized devices (e.g., as long as it is in range of a master device).

Through the synchronization and master selection processes, devices are automatically organized into a hierarchical cluster, in which masters at each level (or stratum) of the hierarchy periodically broadcast synchronization parameters in order to achieve and maintain synchronization among devices in an area. Discovery Beacons (DBs) are one mechanism for disseminating synchronization parameters, and are consumed by all synchronized devices.

Discovery beacons serve to convey information such as, but not limited to, information for synchronizing devices' clocks, a description of one or more upcoming availability windows during which cluster devices can rendezvous, and metrics (or attributes) of the anchor master and the synchronization master that transmitted the DB. In other embodiments, a DB may include a different collection of information, but will normally include criteria identifying at least one availability window.

Formation of a cluster and synchronization of devices within it may be affected by configuration or operating parameters such as, but not limited to: a maximum depth or stratum of the cluster, periodicity of discovery beacons, number of master devices (e.g., overall and/or within range of a given device), the selection algorithm used to select masters, device metrics or attributes considered by the selection algorithm, etc. In different embodiments, different parameters may be applied. U.S. patent application Ser. No. 13/736,725, entitled "Group Formation within a Synchronized Hierarchy of Peer-to-Peer Devices" and filed Oct. 22, 2012, discloses methods of selecting masters in a peer-to-peer network and of forming private groups, and is incorporated herein by reference.

FIG. 1 depicts the use of discovery beacons for achieving and maintaining synchronization among two or more devices, according to some embodiments.

In these embodiments, discovery beacons 110 (e.g., beacons 110a, 110b, 110n) are transmitted on regular bases on one or more social channels 120 (e.g., channel A 120a, channel B 120b, channel N 120n).

Different master devices may transmit discovery beacons on the same or different social channels, and any given master may use one or more social channels (and/or other channels) to convey its DBs. Different masters in a single cluster may use different social channels, perhaps to avoid interference with each other, because the social channel used by one master may be in use by a different master for a different purpose (e.g., an infrastructure connection), and/or for some other reason. Availability windows may or may not be conducted on social channels.

Although multiple social channels 120 are depicted in FIG. 1, in some implementations all master devices in one cluster may use the same social channel and advertise the same schedule of availability windows. Social channels and/or other channels discussed herein may be IEEE 802.11 wireless channels that do or do not have restrictions. For example, a social channel or other type of channel used to transmit beacons or to communicate among peer devices may be subject to DFS (Dynamic Frequency Selection) and may involve restrictions on its use. One such restriction, addressed in a subsequent section, requires devices to exit a channel when a particular type of signal (e.g., a weather radar pulse) is detected. As discussed in the subsequent section, this may require modifications to peer devices' normal communications.

On social channels 120a, 120b, 120n, respective discovery beacons 110a, 110b, 110n are broadcast on periodic bases by a responsible master. Each of the DBs broadcast by a single master on a single channel (e.g., beacons 110a) may be identical or may differ somewhat.

Although the period of discovery beacons of each channel ($P_A$, $P_B$, $P_N$) is different in FIG. 1, in some embodiments in which multiple social channels are employed, the beaconing periods of two or more channels may be identical. An illustrative period between DBs on one channel may be on the order of 100 milliseconds, but may not be exactly 100 ms. Different masters may use the same or different DB periods. In some implementations, the length or duration of a discovery beacon period may be inversely proportional to the overall number of masters broadcasting DBs (or the number of masters in a particular region that are broadcasting).

It may be noted that time periods denoted herein as milliseconds (ms) may alternatively be implemented in terms of time units (TU) of the same or equivalent magnitude. As specified in the IEEE 802.11 standard, a time unit is equal to 1,024 microseconds. Thus, a 100 ms time period referred to herein may instead be implemented as 100 time units or as an equivalent number of time units (e.g., approximately 98 TU), 102.4 ms may be implemented as 100 TU, etc.

In some embodiments, DB periods will be different on each social channel; however, the availability window periods implemented by the masters issuing the DBs may be the same. Therefore, within one cluster, multiple DB periods and a single availability window period may be implemented.

When transmitting a DB, the issuing master merely needs to tune its radio to the correct channel and power it on long enough to send the beacon. It need not remain on that channel after issuing the DB, but rather can turn off its radio to conserve power, switch it to a different social channel (e.g., to prepare to transmit a DB on a different channel), or use it for some other purpose, such as attending an availability window (as described below), handling infrastructure communication, exchanging data with another device, etc.

In some embodiments, discovery beacons need not adhere to strict periodic scheduling. Instead, beacons may be sent as regularly as possible but defer to other device operations as warranted. In some implementations, discovery beacons need only to be issued frequently enough to yield at least a minimal average periodicity that enables new peer devices to discover a cluster of devices with some probability or within some limited length of time.

DB 110x of FIG. 1 is an illustrative beacon broadcast by a master in some embodiments. In other embodiments, a discovery beacon may contain a subset or a superset of the illustrated elements. For example, although DBs are primarily described herein as being issued by masters, non-master devices may also issue discovery beacons or other types of beacons or frames, but these non-master beacons or frames may include only a subset of the information elements carried by DB 110x, and may be issued with longer periods.

In the illustrated embodiment, the information elements of channel 130, time 132, and period 134 (and possibly duration 136) may be collectively referred to as "synchronization parameters" or "availability window parameters" because they allow a listening device to learn of a sequence of availability windows that has been imposed by the master that issued the DB (or by a superior master). Channel 130 identifies the channel (e.g., an 802.11 wireless channel) on which all availability windows (or at least the next availability window) will occur, time 132 identifies when the window(s) will occur, and period 134 identifies the availability window period, which will allow the listening device to calculate successive availability window starting times. Duration 136 identifies the duration of the availability window.

Multiple sets of synchronization parameters may be included in a DB, either to advertise sequences of availability windows on different channels, to advise other devices of a change from one sequence to another, or for some other reason.

Time element 132 of the synchronization parameters of illustrative discovery beacon 110x may identify an absolute starting time (e.g., based on a synchronized clock, UTC (Coordinated Universal Time) or some other common reference), and/or a relative time. In some implementations, the timestamp field carries the TSF (Time Sync Function) of the station that issued DB 110x.

In some embodiments, time 132 includes multiple values that a peer device uses to compute the starting time of the next availability window. For example, time 132 may include a "target" timestamp configured to indicate when DB 110x was formed and queued for transmission within the issuing master (e.g., when the DB was placed into a transmit buffer), and an "actual" timestamp configured to indicate when the DB was actually dispatched via the master's antenna.

Illustratively, the DB may be considered formed as of the time a "master offset" parameter is calculated by the master. The master offset value, also included within DB 110x as part of time 132 or a different information element, represents the issuing master's internal offset to the start of the next availability window, measured from the time it releases the DB. Thus, the master offset measures the period of time from the target timestamp to the start of the availability window, as calculated by the station that issued the discovery beacon.

With these values, a peer device that consumes DB 110x can compute an offset to the starting time of the availability window as follows:

$$\text{Offset} = \text{Master offset} - (\text{actual timestamp} - \text{target timestamp})$$

In particular, the peer device receives the master offset and, from the target and actual timestamps, can measure how much of that master offset time period has elapsed; it then subtracts that elapsed period from the master offset to determine the amount of time remaining until the availability window.

Period 134 identifies the period of availability windows conducted by the issuing master. The entire cluster of peer devices may apply the same period and the same schedule of availability windows, illustratively set by the cluster's anchor master.

Duration 136 of DB 110x is optional in some implementations, but when provided indicates the minimum amount of time, during the availability window, that the device that issued DB 110x will be listening and available for communication. The duration may also apply to the synchronized devices that consume beacon 110x; that is, a device that attends the window may be required to be available for at least that period of time, measured from the commencement of the window.

In some embodiments, a master may automatically extend its availability window (e.g., in increments matching duration 136 or by some other time duration) as long as at least one station is communicating with it during that window.

Thus, even if multiple stations wish to communicate with the master device, because the window will be extended, they may be able to do so without waiting for another availability window.

Similarly, a peer device that attends the availability window may extend its window as long as at least one of its peers engages it in communication. Therefore, one peer that wishes to communicate with another peer may simply issue a first set of packets, datagrams, messages or other units of communication to that other peer during an availability window. Both peers will then automatically extend their windows because of the active communication. Advantageously, this allows extensive peer-to-peer communication during availability window extensions without saturating or monopolizing bandwidth during the availability window.

Thus, a maximum duration of a master's presence during an availability window may be specified in DB 110x and/or may be announced during the availability window. Illustratively, the master may need to depart the window in order to issue a DB on a different channel, to use its radio for another communication function, or for some other reason. As for individual devices, they may depart an availability window if they have nothing to communicate and if no other device communicates with it during some period of time within the window.

In other embodiments, the availability window parameters of a discovery beacon may explicitly identify one or more availability windows instead of identifying just one and supplying a period. These embodiments may be implemented in environments in which a master device and/or other peer devices cannot commit to a regular, periodic schedule of availability windows. In yet other embodiments, a periodic schedule may be applied, but one or more availability windows may be explicitly added to the schedule, or one or more occurrences of a periodic window may be cancelled.

Thus, synchronization parameters or data of a DB may identify any number of availability windows (e.g., one or more). Different DBs transmitted on the same or different social channels, and by different masters, may identify the same or different availability windows. Typically, however, synchronization parameters set by the anchor master (including the schedule or sequence of availability windows) are applied throughout the cluster. Thus, in these embodiments, all discovery beacons broadcast throughout the cluster report the same schedule of availability windows.

In some embodiments, availability windows are numbered and conducted as a repeating sequence. For example, the n availability windows conducted in one sequence may be numbered 0 through n-1. After one iteration, the availability window sequence numbers repeat (i.e., from 0 through n-1). The sequence number of the next availability window occurring after DB 110x may be explicitly identified in the beacon (e.g., in an information element not depicted in FIG. 1), may be determined during the availability window, or may be learned in some other way.

Illustrative discovery beacon 110x of FIG. 1 also reports one or more preference values (alternatively termed a master rank, a master preference value or a selection value). A preference value is a value (e.g., an integer) used to identify the suitability or preference of a device to be a master. A device's preference value is calculated using various metrics, attributes, or characteristics of the corresponding device, and possibly characteristics of the communication environment or the device's cluster. Illustrative metrics for calculating a device's preference value include the device's available power resources (e.g., battery strength or charge, connection to an AC power source), processor load, signal strength, the device's name and/or address (e.g., MAC address), name or address of the device's anchor master, a timestamp, the device's level or stratum within the cluster (e.g., number of hops from the anchor master), the periodicity (or average periodicity) of the device's discovery beacons, a social channel used by the station, an infrastructure channel the station must periodically tune to, other device obligations (e.g., Bluetooth coexistence, infrastructure connection), and so on.

Preference values of synchronized devices may be compared as part of a selection process to determine which devices should be masters within one cluster. The process may be executed on a regular basis, such as during or after every sequence of availability windows, on a fixed schedule, etc.

In DB 110x, sync master preference value 140 is the master preference value of the synchronization master that broadcast discovery beacon 110x, and indicates that device's suitability or preference to be a master within its cluster. By advertising its preference value, all devices in range of that master can correctly apply the selection process and, for example, determine whether they are better suited to be a master.

Similarly, anchor master preference value 142 is the master preference value of the anchor master for the cluster in which beacon 110x was broadcast, and indicates that device's suitability or preference to be a master. Illustratively, by propagating anchor master preference value 142 throughout the cluster, a device at the fringe of the cluster or in an area overlapping multiple separate clusters can determine which cluster to join. In addition, all devices in one cluster can determine whether they are better suited to be the anchor master.

When DB 110x is issued by the anchor master of a cluster, preference values 140, 142 will match. Alternatively, one of the preference value fields could be omitted.

In some implementations, a discovery beacon may include information elements other than those depicted in DB 110x of FIG. 1. For example, a beacon may identify an algorithm for selecting masters, specify constraints on masters (e.g., how many can be within range of each other), advertise a maximum depth for the device's cluster, provide a notification that a device is departing the cluster, etc.

Although a master may have a stated period to the issuance of discovery beacons, as already mentioned that period is flexible and there may be high tolerance for variation. A given DB may be advanced or delayed in time because of other demands on the master device's radio, because of contention on the communication channel, or for some other reason. In some implementations, DBs may vary on the order of +/−20 milliseconds every 100 milliseconds. In some other implementations, variation may be as great at +/−100 ms, as long as the long-term average periodicity of discovery beacons is approximately 100 ms.

Discovery beacons may be transmitted opportunistically, meaning that if a master's radio is tuned to a different channel at the time it would ordinarily issue a DB on a social channel, it may instead issue the beacon on its current channel. Discovery beacon broadcasts will return to their normal schedule on the social channel(s) when able.

This type of situation, in which a DB is sent on a non-social channel to identify a future availability window, can be useful to a localized cluster of devices. Such devices likely will be associated with the same infrastructure network on the same (non-social) channel. Transmitting a DB on this channel saves these devices the cost of a channel switch (i.e., to the social channel) and avoids interfering with their infrastructure communications.

In the worst case, a new device tuned to a master's normal social channel may miss a limited number of discovery beacons if the master is busy on a different channel. However, the master may be tuned to a commonly used frequency (e.g., an infrastructure channel required for a particular application, as described above), and may therefore reach the same device at a different time.

Among other information that may be included in a DB is the issuing master's (average) period for sending discovery beacons, and the channel or channels the beacons will be broadcast on. This allows a peer device to determine the amount of time it may need to listen on a particular social channel in order to hear a DB and learn the availability window schedule.

Availability windows scheduled by a master may or may not occur at a regular period, and may or may not be synchronized with the master's DBs. In other words, the availability windows need not occur at identical offsets from the discovery beacons. An illustrative duration of time that a full sequence of availability windows occupies may be on the order of multiple seconds, although a specific implementation of an embodiment may employ a shorter or longer duration.

In some embodiments, there is less tolerance regarding an availability window period than there is regarding a discovery beacon period, perhaps on the order of +/−100 microseconds per second for availability windows (compared to +/−200 milliseconds per second for DBs). Whereas DBs are very short (e.g., less than 1 millisecond) but issued frequently, availability windows are relatively long and conducted infrequently. For example, availability windows may last 16 ms, 50 ms or longer. Discovery beacons may be scheduled opportunistically because of their short duration, but availability windows are configured for device discovery and communication, and therefore generally may not be conducted spontaneously or opportunistically.

Although relatively infrequent, availability windows may monopolize a radio interface for a significant period of time; because of this, adherence to a strict schedule is advantageous, especially if other radio technologies are present (e.g., Bluetooth). Also, other (synchronized) devices are depending upon the advertised schedule of windows for discovery and/or peer communication, which leaves less room for variation.

Therefore, in some embodiments, a discovery beacon period will have a relatively high tolerance for variation, while an availability window period has a relatively low tolerance for variation. One advantage of this strategy is that it allows for Wi-Fi contention that occurs at every discovery beacon transmission. Transmission of a discovery beacon is only possible when the selected social channel is not in use, and contention for the channel or the radio may or may not delay issuance of the DB. Therefore, strict scheduling of all DB transmissions would be difficult to achieve.

When a peer device first synchronizes with a master device and begins attending availability windows, in the first window (and/or the first window that all devices are required to attend) it may issue a message identifying itself, identifying its preference value, providing its selection metrics, advertising its services, etc. Any devices wishing to communicate with it can then make contact.

Although availability windows are provided as a primary mechanism for peer devices to discover each other and services that are offered, a device (including a master) may skip one or more windows in a sequence. For example, if a peer device needs to use its radio for some other purpose at regular intervals that occasionally overlap with an availability window, it may not attend a conflicting availability window at all, may arrive late or may leave early. The device may or may not advise a master or other devices of its absence (e.g., via a multicast message).

In some embodiments, a device may set a "presence mode" for itself, and advertise this value to its master (i.e., the master with which it has synchronized) and/or other peers, to indicate how frequently it will tune to or attend advertised availability windows. In some implementations, a presence mode (or PM) is an integer value such as 1, 2, 4, etc. The reciprocal of the device's PM is a fraction indicating how many availability windows in a sequence it will attend. For example, if a device's PM is equal to 1, the device will attend every availability window; with a PM of 2, the device will attend every window having a sequence number that is a multiple of 2 (i.e., ½ of the windows); if its PM is equal to 4, it will attend every window whose sequence number is a multiple of 4 (i.e., ¼ of the windows).

Higher presence mode values allow a device to skip more windows and turn off its radio, thereby saving power. Ultimately, a presence mode equal to the number of availability windows in a sequence means that a device will attend only one availability window per sequence. A PM value of zero may indicate that a device is always available (i.e., not just during availability windows).

In some embodiments, every synchronized device must attend at least one availability window in the sequence advertised by its master. For example, devices may be required to attend availability window 0 of each sequence. Thus, in this case, a PM value equal to the length of the availability window sequence indicates that the device will be present only during availability windows having sequence number 0.

The length of an availability window sequence is generally a power of 2 (e.g., 8, 32, 256). In some implementations, sequence numbers of availability windows conducted by a master begin at zero, and increase one at a time until reaching the value length-1 (e.g., 7, 31, 255), after which they repeat. Synchronization masters are required to adopt and repeat (in their beacons) the current sequence number of its master (i.e., a higher-level synch master or the anchor master). Therefore, all devices synchronized under one anchor master (i.e., all peer devices within one cluster) will agree on which availability window has sequence number 0.

In some embodiments, sequences of availability windows advertised by different masters may be of different lengths. However, all sequences will be aligned so that all devices having a particular presence mode value will attend the same windows. In other words, all devices will agree on which particular windows are multiples of a given number.

For example, consider a cluster in which availability window sequences of lengths 8, 16, and 64 are in use among different sets of devices (e.g., devices synchronized with different masters). Among the devices implementing the sequence of eight windows, every eighth window will be known as availability window sequence number 0. Every availability window having sequence number 0 for those devices will be an availability window having sequence number 0 or 8 for those devices having a sequence that is 16 windows long, and as an availability window having sequence number 0, 8, 16, 24, 32, 40, 48, or 56 for those devices with 64 availability windows in their sequences.

A device may attend more availability windows than its PM indicates, but by announcing its presence mode value (e.g., via a multicast message in availability window sequence number 0), other devices will know when they can interact with it. And, as described previously, as long as one peer device sends a communication to a device during a window attended by the receiving device, that device will extend its presence on that channel in order to conduct the communication, if possible, and will be able to be contacted by yet other peers as well.

Further, in some embodiments, whenever a peer device having a presence mode greater than one (or some other threshold) receives a communication, it may automatically set its presence mode to one (or some other lower value) in order to facilitate the desired communication. Yet further, a device with a low presence mode (e.g., zero or one), after receiving a multicast frame in one availability window, may repeat it in one or more subsequent windows to help get it to its peers.

A master may have any PM value; although it sends discovery beacons at periodic intervals (possibly even during an availability window), it may shut off its radio or use its radio or antenna for other communication requirements during an availability window when it is not beaconing.

In some embodiments, two or more peer devices wishing to conduct a relatively extended period of communication (e.g., for file transfer, to engage in a game or other application) may establish their own synchronization for the purpose of exchanging data, parallel to the overall synchronization, but outside of or in addition to scheduled availability windows. In these embodiments, one of the two or more devices may assume the role of a non-selection master, meaning that it does not participate in a formal master selection process, but is available for other devices to synchronize to or with (e.g., to conduct a file transfer, to play a game). Devices synchronized with a non-selection master may form an independent basic service set (IBSS).

A non-selection master may issue beacons that the other peer devices with which it will communicate will use to synchronize with the non-selection master, but which other devices in the cluster will ignore. Illustratively, these beacons may be transmitted during an availability window and/or on an agreed-upon channel. A non-selection master's beacons may specify that the device is a non-selection master, so that devices not needing to directly communicate with it will know that they should not synchronize with it. When a device that has been engaged in communication with a non-selection master terminates that communication, it may re-synchronize with a regular master and rejoin that master's cluster (e.g., if synchronization with the non-selection master caused it to lose synchronization with the cluster).

A device that wants to synchronize or maintain synchronization with a cluster of peers may be unable to do so, perhaps because it cannot monitor the cluster's social channel(s), has other commitments during the scheduled availability windows, or for some other reason. In this situation, the device may become a non-selection master (and identify when it is available) to help other devices discover it. Alternatively, it may request alteration to the cluster's availability window schedule to accommodate the device, or may become a master if its selection preference value indicates that it should. As a master, especially as the anchor master, it could change the availability window schedule.

In some embodiments, during an availability window on a rendezvous channel a master or other device (e.g., a non-selection master) may broadcast a different type of beacon called a synchronization beacon (SB). In these embodiments, synchronization beacons provide information that helps peer devices achieve or maintain synchronization—either with a master that issues regular DBs or with a non-selection master that devices may synchronize with to exchange data directly, for example. A synchronization beacon may be sent during an availability window, but generally will not be sent on a social channel unless, for example, one is sent during an availability window that is occurring on a social channel.

A synchronization beacon may include any data that a discovery beacon might include, and/or other information. For example, an SB might be sent by a master to report that it will start using a different social channel for sending DBs, might be sent by a non-selection master to report that it will have a window of availability on a particular channel at a particular time, might be sent by another device to report synchronization data it heard from some other master or to advertise its availability, etc.

When an availability window overlaps with the time a DB would normally be sent (i.e., according to the issuing master's DB period), the regular discovery beacon may be sent on the channel on which the availability window is conducted (and not on the social channel, assuming the availability window is not being conducted on the social channel). During availability windows that do not overlap with the expiration of a master's DB period, the master may nonetheless send a synchronization beacon to ensure that devices synchronized with it have the necessary synchronization data without having to tune into a social channel for a regular DB. However, a device may still periodically listen on one or more social channels to learn of other masters and/or for other reasons.

Because peer devices having presence mode values greater than one may not attend every availability window, but may be required to be present during availability windows having sequence number 0, a master may by default always broadcast a DB or SB during those windows. Whereas DBs are short but frequent, SBs are longer and less frequent, and may pack extended service and device capability payloads.

It may be worth repeating that discovery beacons are sent frequently, usually outside of availability windows, in order to help non-synchronized devices synchronize with their peers. After a cluster of devices is synchronized, those devices may only (or primarily) meet during relatively sparse availability windows, especially those devices that have adjusted their presence modes to use their radios less and thereby save power. To remain synchronized, these devices may rely on synchronization beacons sent during availability windows.

In some embodiments, devices are required to implement guard periods at the beginning of some (or all) availability windows, during which they listen and can receive communications, but do not transmit. In different embodiments, this restriction may or may not always apply to masters that issue regular DBs, but generally will always apply to non-selection masters.

Figure 2:
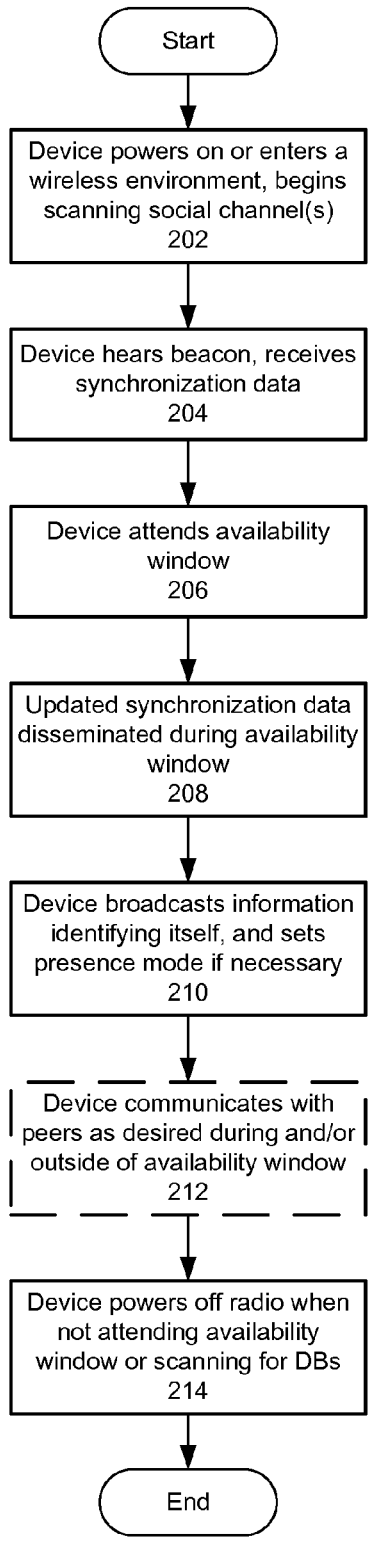
FIG. 2 is a flowchart demonstrating synchronization and operation of a device within a cluster of peers in a wireless communication environment, in accordance with some embodiments.

FIG. 2 is a flowchart demonstrating synchronization and operation of a device within a cluster of peers in a wireless communication environment, according to some embodiments.

In operation 202, the device powers on or enters the cluster's environment and begins listening on one or more predetermined social channels for a discovery beacon (DB). It may be programmed with information regarding the default or possible periodicity of DBs, and may therefore only need to listen on a given social channel for a limited number of those periods (e.g., one, two) in order to intercept a DB broadcast by a master on that channel.

In operation 204, the device hears one or more DBs and extracts the offered synchronization data. In the illustrated embodiment, all DBs issued by masters within the same device cluster advertise the same availability window sequence or schedule. The masters may transmit their DBs on the same or different social channels, and may conduct the availability windows on the same non-social channels.

If the device did not hear any discovery beacon, it may assume that there is no master within range. Therefore, it may take on the role of root master and begin issuing its own DBs in order to synchronize other devices in range.

In operation 206, the device tunes its radio to the specified channel and attends the next availability window, assuming that its radio is not preempted by another application or service. If it cannot attend, the device will attend the next availability window that it can, although it may need to listen on a social channel again to receive the next set of synchronization data and identify the rendezvous channel and starting time. The device may postpone attending an availability window until the start of the next sequence of windows, and therefore tune into the next required window (usually a window having sequence number 0).

In operation 208, during an availability window, a beacon containing synchronization data (e.g., a DB or an SB) is broadcast by the master with which the device is now synchronized. This may relieve the device of the need to scan one or more social channels. The beacon illustratively may be transmitted during an initial guard period or quiet period at the beginning of the availability window, during which non-master devices may not transmit.

In operation 210, the device sets its presence mode if necessary or desired (e.g., if the device cannot attend the full sequence of availability windows). During at least the first availability window that it attends, and/or the first availability window having sequence number 0, the device identifies itself (e.g., address, name, service information) in a message broadcast to all synchronized devices. It may advertise its presence mode at the same time.

In optional operation 212, the device may communicate directly with one or more of its synchronized peers during the availability window and/or out-of-band, or they may communicate with the device. As discussed above, the device may extend its attendance at the window one or more times in order to facilitate the communications, will advertise to its active peers if and when it must leave the window before its normal termination (e.g., to use its radio for some other purpose), and may arrange a separate rendezvous (on the same or a different channel) with one or more peers.

In some embodiments, traffic reduction or limitation measures may be implemented during some or all availability windows in order to reduce communication congestion and collisions. Illustratively, the master that controls the availability window sequence may specify when a measure is in place. In some implementations, traffic reduction measures are only applied during availability windows, and not during availability window extensions. In mandatory availability windows (i.e., availability windows having sequence number 0), traffic reduction measures may be mandatory.

By way of example, a traffic reduction measure may serve to limit a device regarding the number of multicast frames it may transmit during one availability window (e.g., approximately three). Transmission of unicast frames may also be limited.

For example, unicast transmissions may only be permitted to (and/or from) devices having unknown presence mode values or values greater than one (or some other threshold). Limitations on unicast or multicast frame transmission may not apply to devices synchronizing among themselves (e.g., with a non-selection master) for a limited purpose, such as file transfer.

In operation 214, the device may power off its radio when not needed to listen for DBs on a social channel or to attend an availability window.

The method depicted in FIG. 2 is merely illustrative, and does not limit methods according to other embodiments.

As described above, two or more peers may engage in their own synchronization, outside of or in addition to any availability window. For example, one of them may assume the role of a non-selection master and issue synchronization beacons or other discovery beacons during an availability window, to advise its peers as to when and where (i.e., time and channel) they may synchronize with it.

However, one peer may desire a short communication exchange with another peer without synchronizing. For example, a device synchronized within one cluster may wish to discover services offered by a peer (or peers) synchronized within a different (e.g., neighboring) cluster, a cluster device may wish to poll a neighboring peer or may wish to communicate some information to its master, etc. At least initially, they do not intend to engage in a significant exchange of data (e.g., as with a file transfer). Some embodiments provide this ability in the form of out-of-band inquiries and responses.

Figure 3:
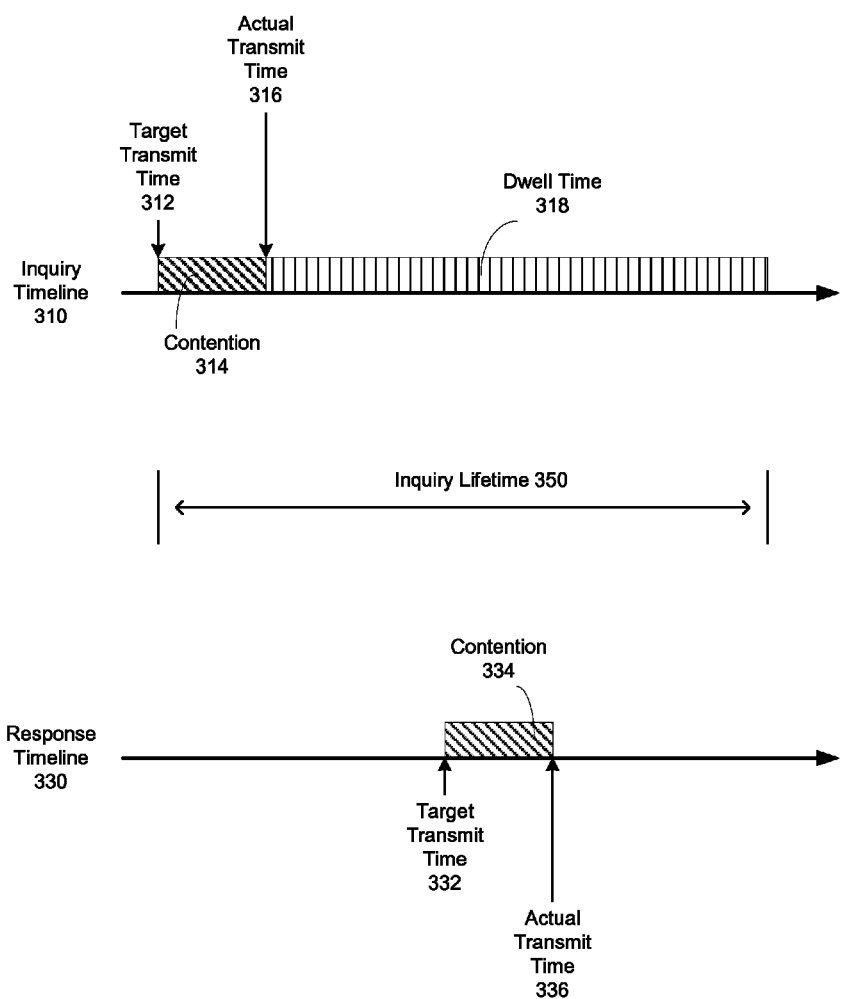
FIG. 3 is a diagram demonstrating an out-of-band exchange between peer devices, in accordance with some embodiments.

FIG. 3 is a diagram demonstrating an out-of-band exchange between peer devices according to some embodiments. As with the timing of discovery beacons described above, the transmitting device must consider delay that will occur within itself, between the time it releases or prepares the inquiry for transmission and the time it is actually transmitted.

Inquiry timeline 310 reflects activity at the inquiring device, while response timeline 330 reflects activity at the responding peer device. When issuing the inquiry, the inquiring device must choose a suitable inquiry lifetime 350, such that the responding device will have time to receive, process, and react to the inquiry.

In the illustrative inquiry and response, the inquiry is queued for transmission from the inquiring device at target transmission time 312. Because of contention for the antenna or the medium, and/or other delay (collectively represented as contention 314 in FIG. 3), the inquiry is not physically transmitted until actual transmit time 316.

Dwell time 318 is the remainder of the inquiry lifetime, during which the responding peer device must receive the inquiry and generate and transmit its response. The duration of dwell time 318 depends on the inquiry lifetime set by the inquiring device and the duration of contention 314. The responding device may also experience delay between its target transmit time 332 and the actual transmit time 336 of the response; this delay is represented as contention 334.

The inquiry may identify (in the out-of-band inquiry) any or all of the relevant time parameters (e.g., inquiry lifetime, target transmit time, actual transmit time, contention), so that the responding peer can determine whether it will be able to respond before the inquiry expires. If not, it may drop the inquiry or abort its response. If the inquiring device does not receive a response during the inquiry lifetime, it may retry (e.g., with a longer lifetime), abandon the inquiry, or take other action.

In some embodiments, a peer device may issue out-of-band inquiries to a master that it can hear, but which it is not synchronized to, in order to identify services offered by that master and/or devices synchronized to that station. In some implementations, it may relay information regarding other masters (or another cluster) to its master and/or synchronized peers, such as during one or more of their availability windows. Information about another master, device, or cluster that may be revealed may include things such as a social channel that it uses, its availability window schedule (e.g., time, channel, period), (average) discovery beacon period, master offset, services it offers, address, etc. An out-of-band inquiry may thus function as a quasi-DB or quasi-SB, in that it may facilitate synchronization of one device to or with another.

Some unsynchronized masters (e.g., masters with which no peer devices have synchronized) may adopt a low-power mode of operation. This low-power mode of operation may be indicated in the station's discovery beacons, or may be inferred by the sequence or schedule of availability windows and/or the presence mode advertised in the discovery beacons.

In one such mode of operation, an unsynchronized master may still send discovery beacons, but provide short availability windows having long periods (e.g., multiple seconds). Because of the short, sparse nature of the availability windows, it may take some time for a peer to discover services offered by the unsynchronized master.

During synchronization of peers within a communication environment according to some embodiments, as peer devices within a cluster are organized into a synchronization tree, non-master devices synchronize with sync masters within range; those synchronization masters (and possibly other non-master devices) synchronize with higher sync masters, and so on, with one anchor master at the top of the tree providing synchronization information for the entire environment. A non-master device may synchronize directly with the anchor master if it is in range.

An operating parameter of devices may specify the maximum depth of the cluster's synchronization tree, which may be defined as the number of levels or strata of masters. The anchor master's position is defined as stratum zero, and synchronization masters will reside in strata numbered 1 through D, wherein D is the maximum stratum at which a master may reside. The depth of the tree may be defined as D (or as D+1 to account for non-master devices), and the maximum number of hops between the anchor master and a non-master (e.g., leaf) device is D+1.

By default, while the cluster is being organized, a peer device may issue discovery beacons until it falls into position as a non-master, at which time it may or may not stop transmitting beacons. A device may choose to be a non-master device, even if the applicable selection algorithm could otherwise make it a master, unless there is no master in range of the device. If there is no master in range, the device must take on that role.

All masters continue to issue DBs to maintain synchronization within their areas, and may do so with a periodicity that is a function of its level, or stratum, within the cluster. For example, the anchor master at stratum 0 may issue DBs on the order of every 100 milliseconds, a synchronization master at stratum 1 may issue DBs on the order of every 150 ms, a sync master at stratum 2 may issue DBs every 500 ms, and so on. These values are merely exemplary and in no way limit or restrict the duration of DB periods; masters within different strata may employ the same period, and masters in the same stratum may employ different periods.

A master's stratum will usually be reported within its DBs. This information allows a listening device to determine how deep the cluster is within its area of the cluster. Depending on that depth and/or other information (e.g., how many masters it can hear issuing DBs, the maximum cluster depth), the device may determine that it should be a non-master or that it should continue issuing DBs and remain a master.

A cluster's maximum depth parameter may be programmed into devices and/or advertised within discovery beacons and/or other beacons. Other restrictions may also be imposed, such as a maximum number of masters, a requirement that a master only continues in its role as long as it can hear no more than a threshold number of other masters (e.g., within a particular range, at a particular stratum, overall), etc.

For example, where the cluster's maximum depth is D, a master situated at stratum $S \geq 1$ (i.e., all strata except that of the anchor master) may only be allowed to hear D-S other masters operating in stratum S and still continue to serve as a master (assuming those other masters have higher or better master preference values). This provision may allow for concentration of higher level sync masters near the anchor master, and dispersion of synchronization masters further away.

In some embodiments, a master selection algorithm or process may prefer to retain an incumbent master over another device that would otherwise be given preference, unless the other device's selection preference value exceeds the incumbent's by a threshold. This may help avoid thrashing or excessive switching of masters. However, because a master's principal task is simply to broadcast synchronization data, switching masters does not impose a high transaction cost on the cluster or an individual device.

In some embodiments, a device will synchronize with the best master that it can hear (i.e., the master having the highest preference value), or the best master that it can hear within a given range (e.g., with a signal strength above a particular threshold).

When a device comes online in an environment and listens for discovery beacons, if it only hears from a synchronization master at the deepest or maximum permitted stratum of a cluster, it may synchronize to that station as a non-master. If, however, the device can also hear another master in a different cluster (e.g., as determined by the anchor master attributes advertised in a discovery beacon), it may favor joining that cluster if that other master is not at the maximum depth or stratum, or if that other master has a better master preference value.

A device that can only hear other devices relatively deep in the cluster (e.g., high strata values), may be able to determine that it is at the fringe of the synchronized environment. If most or all of the other devices are already at the maximum depth, a new cluster may spawn, especially if a device with a high preference value appears.

A new environment/cluster may also spawn when an existing one spans too large a spatial area. For example, a combination of the depth of the cluster, a measure of how close peer devices are, and/or other factors, may cause a new cluster to be spawned. Signal strengths detected between peers may be one way of determining the proximity of peers.

Requiring peers to synchronize only with masters relatively close to them may cause the cluster to be relatively compact. In contrast, a high limit on the maximum depth of the tree may allow the cluster to cover more area. By adjusting these (and/or other parameters), a suitable cluster may be formed.

Different parameters for configuring a cluster will be suited to different environments, depending on the density of devices, the communication load and/or other factors. For example, if the load is relatively light (e.g., the devices are low-power sensors), drawbacks associated with a hidden node problem should be limited and a relatively deep cluster may be implemented (e.g., on the order of ten to fifteen levels). Also, in sparser environments, a process for selecting masters may resolve faster.

The hidden node problem refers to a scenario in which multiple devices that are not in range of each other try to communicate with a common peer. Because they cannot hear each other's transmissions they cannot avoid them, and their communications to the common peer may collide. Although this may be exacerbated by the need to communicate during a relatively short period of time (e.g., within an availability window), a light load may help mitigate the problem and allow a deeper cluster than would be possible in a denser environment with a heavier load.

Without a method of synchronization described herein, the total number of discovery beacons or frames needed to discover all devices in an environment could approach the square of the number of devices (i.e., each device might need to send at least one frame to every other device). These frames would be sent at random times and on any channels.

In contrast, the collective synchronization afforded by some embodiments enables synchronization based on regular transmissions from a select set of devices (i.e., masters), and scales well. In a perfectly synchronized environment, the number of frames needed for all devices to discover each other is proportional to the number of devices. One discovery beacon broadcast during an availability window having sequence number 0 will reach all other devices in range.

Cooperative Channel Switching

In some embodiments, a peer device plans or adjusts a sequence of channels to which to tune a radio, based on multiple competing demands that include a data transfer or data exchange operation. For example, and as discussed previously, as part of a synchronized peer-to-peer network a device may be required to attend one or more availability windows on a rendezvous channel, and may need to broadcast or receive Discovery Beacons (DBs) on one or more social channels. Other device functions may also require use of a shared antenna to maintain a connection with an access point, to scan one or more channels other than the current channel, support Bluetooth® operations, etc.

Traditional methods of accommodating multiple demands on a shared communication resource usually involve granting the resource to one function after another, in succession. In these methods, for example, a device's peer-to-peer communication session with another device (e.g., for data transfer) might be interrupted to accommodate a Bluetooth requirement to contact another entity, then the peer-to-peer session could resume, only to be interrupted by a requirement to tune to a social channel to capture a discovery beacon, then return to the data transfer operation, then change frequencies to conduct a channel scan, etc.

One problem with these traditional methods of accommodating competing demands for a device's radio is that the throughput of a data transfer operation being conducted by the device will suffer. In particular, each time the radio must be tuned away from a communication partner the data communication must cease for some period of time.

Therefore, in some embodiments, a sequence of channels to which a peer device will tune its radio is designed to promote an ongoing data exchange or other communication while the device is satisfying one or more competing communication demands. In these embodiments, a device that must share a communication resource (e.g., radio, antenna) among multiple functions or operations while engaged in a data transfer with one or more peers will devise a sequence of frequency changes that will accommodate those demands, advise those peers of the schedule and, during the sequence of changes, continue exchanging data to the extent possible.

Because each frequency change may have a predetermined duration (e.g., 60 ms, 100 ms), and the device may need only a fraction of that time to satisfy the workload that required tuning to a particular channel (e.g., to conduct an active or passive scan, to issue a beacon or other signal, to capture a beacon), for the rest of the time spent tuned to the channel the device may continue transferring data with a peer that is able to accommodate some or all of the frequency changes.

In some embodiments, a pair of peer devices may contrive to exchange data to transfer a file, to play a game, to discover services and/or for other reasons. To support the data exchange, in different implementations the pair of devices may form a private group within their synchronized cluster, one of them may become a non-selection master, in which case the other will synchronize with it, they may engage in out-of-band communications, or some other form of cooperation may be conducted.

For purposes of explaining some embodiments, it will be assumed that the devices are synchronized—either one has synchronized to the other or they have both synchronized with one or more synchronization stations within the same hierarchical cluster. They may be a group, or part of a group, one may be a non-selection master, or they may have implemented some other form of one-to-one synchronization.

Because they are part of one hierarchy, they have a common commitment to maintain synchronization with that cluster, which in these example embodiments requires them to tune to specified channels to receive DBs and/or attend availability windows. For purposes of illustration, they each also have separate requirements to regularly contact different access points or other infrastructure devices.

Figure 4A:
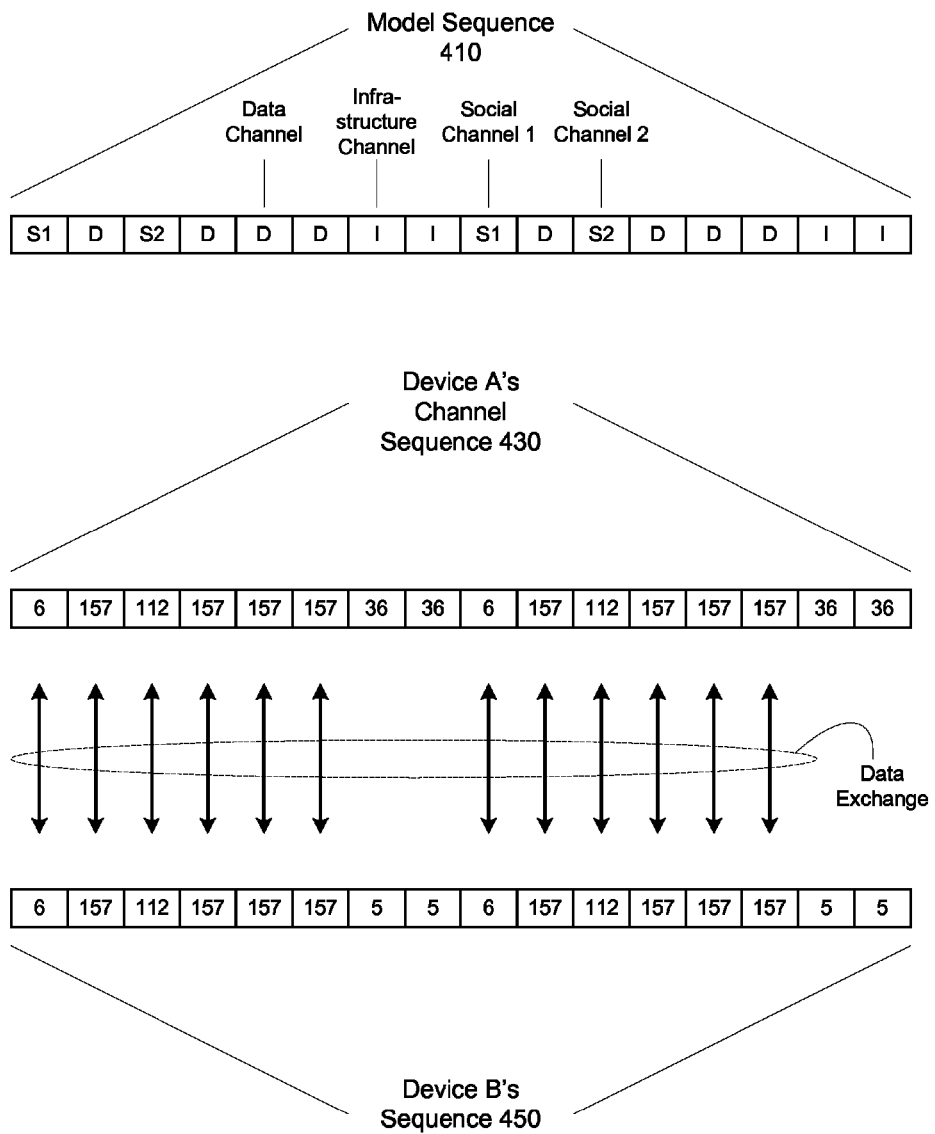
FIGS. 4A-B depict a sequence of channels devices will tune to in order to satisfy conflicting communication demands while conducting a data transfer operation, in accordance with some embodiments.

FIG. 4A illustrates channel sequences for two peer devices engaged in a transfer of data, within a peer-to-peer networking environment described herein, according to some embodiments.

In this illustrative scenario, model sequence 410 is a template showing a sequence of functions to which a device is to dedicate its wireless communication resources in one cycle of operation. In this scenario, an entire cycle lasts 960 ms and is divided into 16 time slots that are each 60 ms long. The functions are abbreviated as follows:

| Function | Device A's Channel | Device B's Channel |
| --- | --- | --- |
| S1: Social Channel 1 | 6 | 6 |
| S2: Social Channel 2 | 112 | 112 |
| D: Data Channel | 157 | 157 |
| I: Infrastructure Channel | 36 | 5 |

Because devices A and B are synchronized within the same hierarchy (or with each other), they use the same social channels "S1" and "S2"—channels 6 and 112. As discussed above, a social channel is a channel on which one or more master stations broadcast discovery beacons. Peer devices will therefore tune to a social channel to receive a DB. Illustratively, one of the two social channels (e.g., S1) may be in the 2.4 GHz band and the other (e.g., S2) in the 5 GHz band. Devices A and B may be dual-band devices and therefore monitor both channels.

Data channel "D" is the channel selected for devices A and B to use to conduct their data exchange. The specific channel (e.g., channel 157) may be one of a predetermined list of channels to attempt to use, one of the two devices may have specified or requested the channel, it may be identified in a DB or SB, or it may have been selected or specified in some other manner.

Infrastructure channels "I" are used by devices A and B to maintain contact with their respective access points or some other infrastructure component. As shown in model sequence 410, each device must periodically use its radio to support the infrastructure connection. Because they are assumed to be participating in separate basic service sets (BSS), each has a different infrastructure commitment (i.e., channel 36 for device A and channel 5 for device B).

Channel sequences 430, 450 illustrate the sequence of channel switches implemented by devices A and B, respectively, and are configured according to model sequence 410. It may be noted that the devices have scheduled use of the data channel for the same slots, and will use those slots to conduct their data exchange.

In some embodiments, channel sequences 430, 450 comport with a schedule of availability windows issued by a master. For example, some or all of the time slots scheduled for data exchange on channel 157 may match scheduled availability windows on that channel. As described in the previous section, a sequence of availability windows may be relatively long (e.g., multiple seconds), and a device need not attend every availability window. Therefore, channel sequences 430, 450 may include one or more time slots that coincide with availability windows.

In some embodiments, each device knows the schedules of its peers, regarding their channel sequences. Therefore, each of devices A, B know that the other device is tuned to the same social channels during the $1^{st}$, $3^{rd}$, $9^{th}$, and $11^{th}$ time slots of a communication cycle. In addition, because each of devices A, B knows the other device's presence mode value, they know which availability windows the other device will attend.

In some implementations, during a time slot intended to permit capture of a DB, the devices may proceed with their data exchange after they have received the beacon, or may conduct their data exchange as usual during these slots, and allow the master that is to send the DB to contend with the peers for use of the channel. In yet other implementations, however, the full time slots may be dedicated to receipt of discovery beacons and/or attendance at an availability window during the social channel time slots.

In the sequence of communication operations depicted in FIG. 4A, channel switches are required, but with only limited competition between different communication functions. In particular, each device has a commitment to maintain an infrastructure connection; these connections are on different channels and hence do not permit opportunistic data exchanges. However, because these infrastructure requirements are scheduled during the same time slots, both devices satisfy them in parallel.

Each device also participates in a peer-to-peer communication environment, which requires them to periodically capture beacons and/or take other action (e.g., attend availability windows). Finally, the devices are engaged in a data exchange operation that directly conflicts with the infrastructure connection requirements, and which may also conflict with the peer-to-peer synchronization requirements. In particular, the synchronization requirements of the peer-to-peer network may allow for opportunistic data exchange, but the infrastructure requirements may not.

Figure 4B:
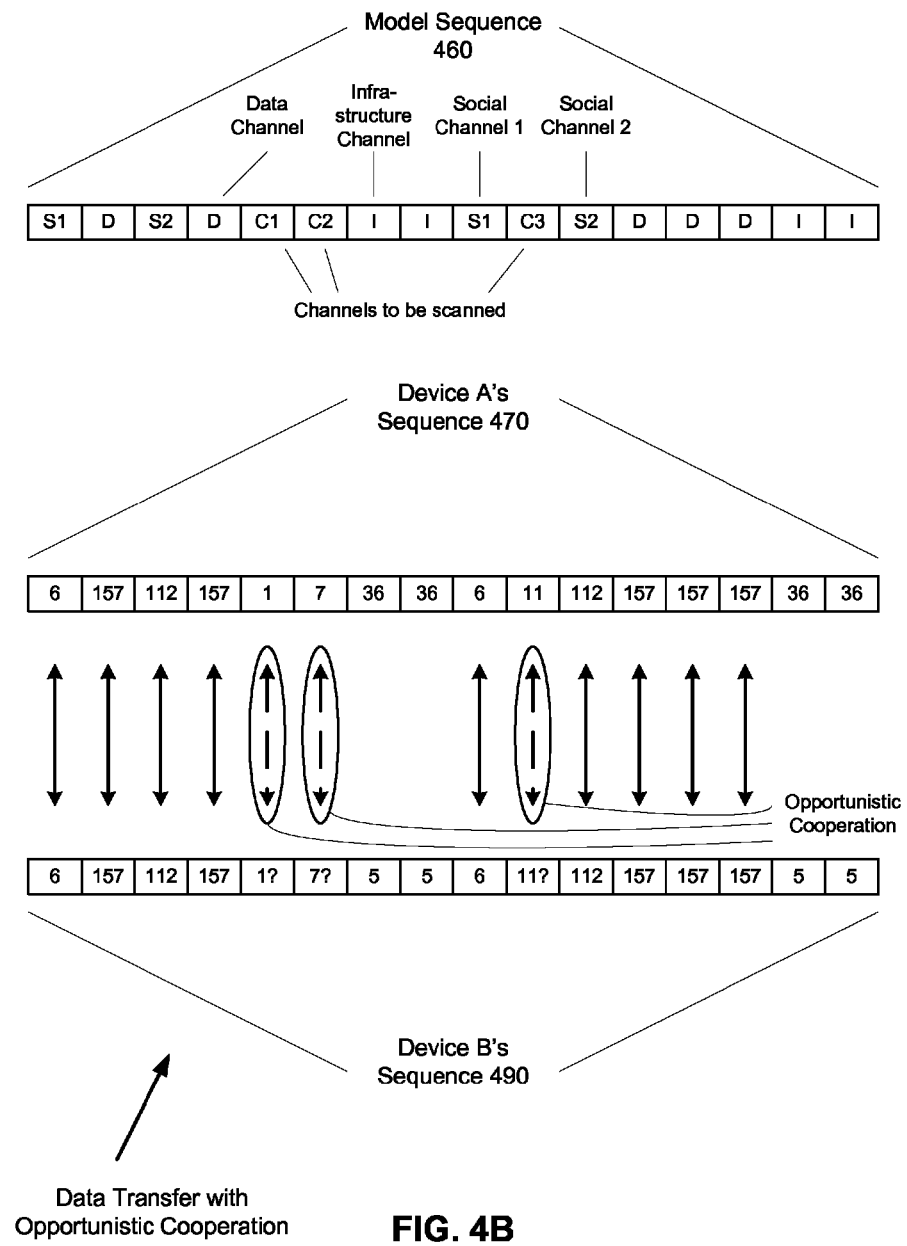

FIG. 4B depicts a further change to device operations, in that device A now has a requirement to conduct scans on multiple different channels—channels 1, 7, and 11. For purposes of illustration, it is assumed that each scan can be completed within one time slot. The manner in which the devices cooperate to opportunistically continue their data exchange while one of them conducts channel scans may also be applied when one or both devices must satisfy a different type of demand for a communication resource shared among multiple functions of the device.

In a traditional peer-to-peer communication scheme, the data exchange between devices A, B would be suspended while device A tunes to channels 1, 7, and 11 and conducts the necessary scans. In the illustrated implementation, this would cut the throughput of the data exchange by 25%. Whereas they had been exchanging data during 12 of the 16 time slots of a cycle in FIG. 4A, now 3 of those 12 time slots are used for an incompatible function.

However, according to some embodiments, device A will advise device B of device A's new channel sequence 470, in advance of its implementation. For example, device A may describe sequence 470 (or just describe its delta from sequence 430) and indicate when it will be implemented (e.g., at the start of the next communication cycle). Device A may pass this information to device B in the course of their data exchange, may conduct an out-of-band communication, may announce its new channel sequence during an availability window, may issue a synchronization beacon (SB), etc.

In response to this notification, device B will determine whether it can accommodate some or all of the channel switches. To the extent it can, it will do so and the devices will continue their data exchange during those time slots, on the new channels.

In some embodiments, device A will attempt to minimize the disruption to a data exchange operation that will be caused by satisfying a conflicting demand on a shared communication resource, by satisfying that demand over multiple communication cycles instead of just one cycle as illustrated in FIG. 4B. For example, instead of putting all three channel scans into sequence 470, device A could instead do a scan on one of the three specified channels (i.e., channels 1, 7, 11) during each of three separate communication cycles, which may or may not be successive. This will delay completion of the channel scans, but cause less disruption to the data exchange.

In these embodiments, device A could inform device B ahead of time of all three sequence alterations, or inform device B of one change at a time. In either case, device B may accompany device A in tuning to the target channel at the specified time and continuing their data exchange while device A performs its scan.

Similarly, if device A requires more than one time slot for a scan—such as a passive scan that requires two successive time slots—it will schedule an altered channel sequence and inform device B. To the extent device B can accommodate the change, it will do so and the data exchange will continue.

In some implementations, a discovery beacon or synchronization beacon issued by a peer device (e.g., device A) may include an "invite" field that serves to invite other devices to join the device on a specified sequence of channels if, for example, they have a need to communicate with the device. The invite field may identify one or more specific peer devices invited to join the issuing peer device, or may be a general invitation to all peer devices.

Figure 5:
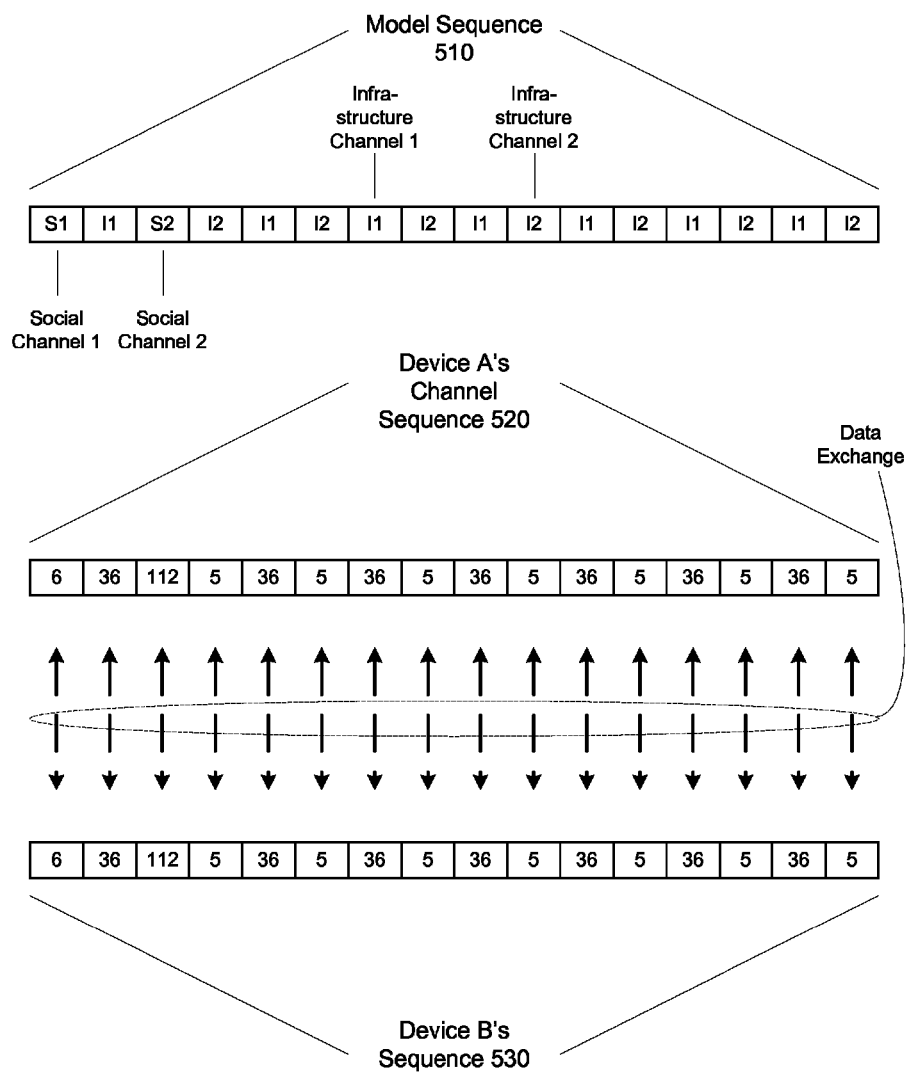
FIG. 5 depicts a schedule of channel switches shared among communicating peer devices, in accordance with some embodiments.

FIG. 5 depicts a pair of peer devices sharing a schedule of channel switches, according to some embodiments. In these embodiments, both devices must maintain infrastructure connections and periodically attend social channels, as described above.

However, in these embodiments, instead of meeting on a separate channel (a data channel) to conduct their data exchange, they alternate between their respective infrastructure channels in order to exchange data while accommodating their infrastructure requirements. Therefore, channel sequences 520 and 530 are equivalent and involve two different social channels, as before, and an alternating pattern of infrastructure channel switches.

Devices A and B may be part of the same cluster, in which case they would periodically tune to social channels 1 and 2 regardless of their data exchange. Alternatively, only one of the devices may be part of the cluster that uses those social channels, and the other device may tune to the same channels in order to conduct opportunistic data exchange with its communication partner.

In the environment depicted in FIG. 5, data transfer can be conducted during all 16 time slots of a 16-slot schedule, instead of having to pause to accommodate infrastructure requirements. Advantageously, one or more additional devices could participate in the data exchange, each having yet different infrastructure channels to attend, and those channels could be incorporated into the common schedule.

Peer-to-Peer Communications on a Restricted Channel

In some embodiments, one or more restricted channels may be employed as social channels (e.g., for issuing and consuming discovery beacons), rendezvous channels (e.g., for conducting availability windows), data channels (e.g., for conducting peer-to-peer data exchanges), and/or infrastructure channels (e.g., for maintaining infrastructure connections with an access point). Use of a channel may be restricted by a regulatory authority (e.g., the Federal Communications Commission or FCC), an agency that manages or controls a portion of the radio frequency (RF) spectrum, or by some other entity.

In some implementations, a restricted channel hosts a preferred or privileged signal emitter or transceiver (e.g., a weather radar system), and use of that channel must defer to that preferred source. For example, a device may be required to exit a restricted channel shortly after detecting use of the channel by the preferred source, or at least remain quiet while on that channel, and may be required to configure its usage to facilitate detection of that source (or at least not degrade the ability to detect the source).

DFS (Dynamic Frequency Selection) is one scheme for selecting and changing wireless communication channels, and is required in some situations (e.g., for portions of the 5 GHz frequency band used by some radar systems). Embodiments of peer-to-peer communication methods described in this section are configured to satisfy the peer devices' communication requirements while using DFS and adhering to a channel's restrictions (e.g., for radar avoidance).

In these embodiments, two peer devices are connected to different infrastructure components (e.g., access points) and are communicating (or are arranging to communicate) to conduct a file transfer, stream media, play a game, or perform some other activity that requires an extended period of interaction. They must also periodically visit their infrastructure channels.

As described in previous sections, the peer devices may conduct their communications by hopping among multiple different channels, possibly with opportunistic cooperation, while satisfying infrastructure requirements and periodically visiting a social channel for discovery. Generally, fixed-length time slots were employed in preceding descriptions, meaning that each time the devices hopped to a different channel, they remained there for a fixed-length period of time. Now, however, they must also accommodate restrictions on one or more channels, which are likely to disrupt their planned schedule.

In some embodiments, one or both of the peer devices' access points are DFS masters that can detect a preferred or privileged radio frequency signal (e.g., a protected radar system's signature) when tuned to a restricted channel, and will order DFS slave devices (such as the peers) to exit the channel or to be quiescent. A peer device that detects such an order will adhere to it, even if the issuing access point is not that peer device's associated access point. Both peer devices (or, if more than two are communicating with each other, then all devices) are able to hear transmissions of both (or all) access points, and will acquiesce to any channel switch announcements they hear from the access points. Thus, a peer device may be required to obey restrictions enforced by an access point with which it is not associated.

In addition, embodiments described in this section ensure that a device's probability of detecting a preferred RF signal on a restricted channel, or of detecting an order to exit or refrain from using the restricted channel, is as good as it would be without implementing the corresponding method of peer-to-peer communications. Peer-to-peer communications inherently occur independently of (and without knowledge by) DFS masters, and so they cannot influence or shape these communications. Therefore, it is important to ensure that the peer-to-peer communications do not interfere with existing DFS procedures. As will be discussed below, this may entail intelligent scheduling of channel hops and implementation of quiet periods at certain times on a restricted DFS channel.

Figure 6:
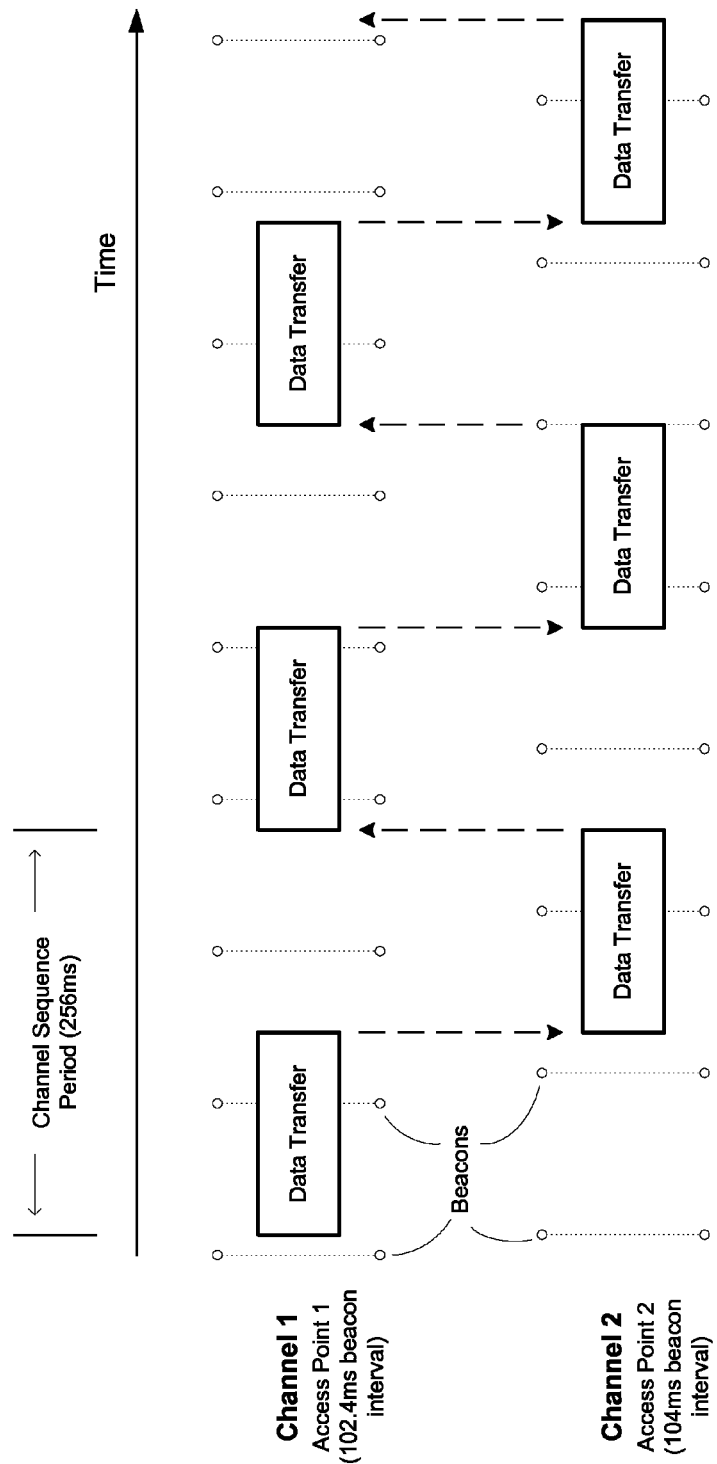
FIG. 6 depicts peer-to-peer channel-hopping communications on two wireless channels, in accordance with some embodiments.

FIG. 6 depicts peer-to-peer channel-hopping communications on two wireless channels, according to some embodiments. These embodiments demonstrate how peer-to-peer communications may be conducted on unrestricted channels; methods of conducting peer communications on one or more restricted channels are then described, to illustrate how a peer-to-peer communication scheme may be modified to defer to the restriction(s).

In embodiments reflected in FIG. 6, two or more peer devices are communicating while channel hopping. Illustratively, one of the devices may be a smart phone (e.g., an iPhone®) while the other is a media device (e.g., an Apple TV® device) that is streaming media to (or from) the smart phone, using AirPlay® or some other media-streaming program that is compatible with the peer-to-peer communication protocol. While the devices' channel hopping is limited to two channels in FIG. 6, the described methods are easily modified for hopping among more than two channels.

In FIG. 6, channel 1 and channel 2 are occupied by access points (APs) that are masters of separate and distinct Basic Service Sets (BSS). In particular, Access Point 1 (or AP1) operates on Channel 1 and is master of a first BSS that includes one of the peer devices, while Access Point 2 (or AP2) operates on Channel 2 and is master of a second BSS that includes the other device (or one of the other devices if more than two peer devices are communicating).

Both access points issue beacon frames (or beacons) at regular intervals that are near 100 ms in duration but that are not aligned. For example, the beacon interval of AP1 may be approximately 102.4 ms while the beacon interval of AP2 may be approximately 104 ms. Thus, beacon frames are not synchronized on the two channels.

As described previously, the peer devices can continue to communicate as they synchronously hop between channels 1 and 2 and satisfy their infrastructure connection requirements. In FIG. 6, the devices employ a channel-hopping sequence of 256 ms divided into two equal-size time slots (128 ms) during which the devices dwell on the two separate channels. The time slots are not synchronized with either access point's beacon intervals, and will therefore occur with variable offsets from the APs' Target Beacon Transmission Times (TBTT).

Assuming one of the peer devices is acting as a non-selection master (or as master of a private group that encompasses the communicating peers), that device may attempt to synchronize with the beacons of its AP or of a regular cluster master (e.g., the anchor master, a branch master) with which it is synchronized, but the other peer device(s) will then necessarily synchronize with the one peer device.

Because neither channel 1 nor channel 2 are restricted, the peer devices may continue their fixed-schedule channel hopping, with fixed-length time slots, as long as necessary to conduct their data transfer. As they switch to each channel in sequence, they can immediately begin or resume their transfer, with minimal latency, and can continue the transfer until it is time to switch to the other channel. Beacons issued by the current channel's AP can easily contend for the channel due to their short length, although there is a possibility that the peers may step on AP's beacon, but neither the beacons nor the devices' data transfer depend upon or require consideration of each other.

However, if one of the channels adopted by peer devices for peer-to-peer communications is a DFS channel, or if both are DFS channels, there is a danger that the channel-hopping scheme of FIG. 6 will violate a restriction. For example, if channel 1 was a DFS channel and AP1 (acting as a DFS master) issued a beacon with a channel switch announcement element while the peer devices were tuned to channel 2, the peers would not receive the channel switch announcement and would resume their data transfer immediately upon returning to channel 1. This would violate the DFS requirements/restrictions because the peers would be transmitting data frames on channel 1 after a channel switch announcement was issued on that channel by the DFS master that they are required to obey.

In addition, continued peer-to-peer data transfer on a restricted channel may cause the peer devices to miss one or more beacons that report the channel switch announcement. Specifically, their peer-to-peer communications may collide with or delay the channel switch announcement. Thus, even if they were tuned to channel 1 (and were engaged in peer-to-peer communications) when the first channel switch announcement was made, they may miss it and fail to defer to the protected signal(s).

Therefore, in some embodiments in which one or more DFS channels are included in a channel-hopping sequence used by devices for peer-to-peer communications, one or more precautions are implemented.

One precaution requires the peer devices, when they switch to a DFS channel, to remain quiescent until they receive a beacon from the AP or DFS master associated with that channel, or some other suitable management frame or action frame that indicates whether the channel is clear of restrictions. The devices will also be quiet around the AP's TBTT, perhaps for a total of 5-10 ms, to avoid colliding with a beacon.

If a beacon or other frame received by the devices indicates the channel is clear (e.g., it does not include a channel switch announcement element), the devices may commence or resume their peer-to-peer data transfer. In some circumstances, if no beacon is received near in time to the TBTT, it may be assumed that the beacon was lost, and peer-to-peer data transfer may resume, provided that precautions are in place to ensure the devices' peer-to-peer communications do not lower the chance of successfully receiving channel switch announcements (e.g., mandatory quiet periods around TBTTs).

To complement this scheme, when peer devices include a restricted DFS channel in their channel-hopping sequence, they may align the sequence with the TBTTs of an AP associated with the DFS channel. If multiple DFS channels are used, they may align (or attempt to align) with TBTTs on all channels. As will be discussed, this may require dynamically sized communication time slots, instead of fixed-size time slots as demonstrated in FIG. 6, because the different APs' TBTTs will drift from one another.

Figure 7A:
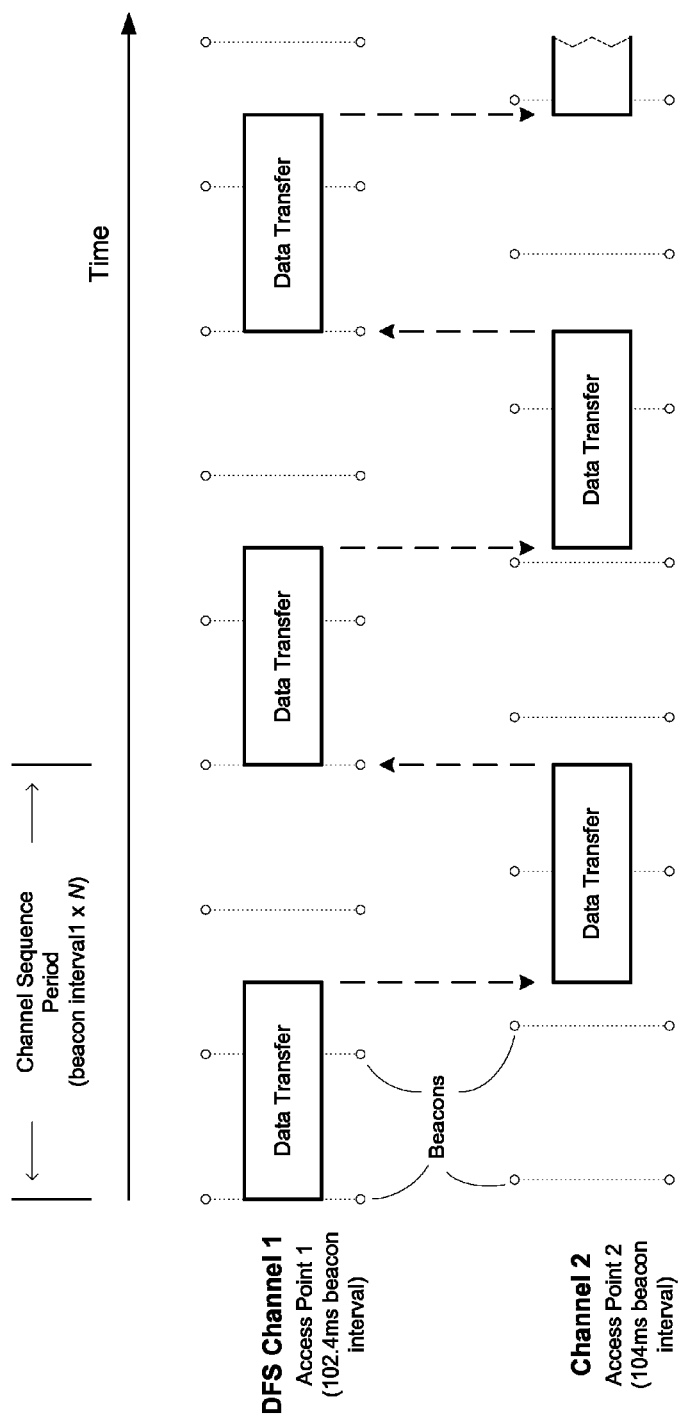
FIG. 7A depicts peer-to-peer channel-hopping communications on two wireless channels, one of which is a restricted channel, in accordance with some embodiments.

FIG. 7A depicts peer-to-peer channel-hopping communications on two wireless channels, one of which is a restricted channel, according to some embodiments. In these embodiments, channel 1 is a restricted DFS channel; therefore, the peer devices align their channel sequence period with a multiple of the beacon interval of Access Point 1 (AP1). In this example, the channel sequence period is 3 times the length of the beacon interval: 307.2 ms (or 300 TU). In other implementations, other multiples may be used (e.g., between 1 and 4, inclusive). Different multiples may facilitate the peers' need to align with different TBTTs or different combinations of TBTTs on multiple channels.

Because the beacon intervals of AP1 and AP2 are not synchronized, the peer devices' channel sequence period and the time slots they spend on channel 2 will not be aligned with TBTTs of AP2. However, because channel 2 is not a restricted channel, the devices need not defer to another signal source on that channel and, instead, can immediately initiate/resume their data transfers when they switch to channel 2.

Each time they switch to channel 1 near in time to a scheduled beacon frame, however, they observe a quiet period of approximately 5-10 ms in order to capture the beacon. In some implementations, the channel-hopping sequence is configured such that the devices switch to the restricted channel shortly (e.g., 1-3 ms) before the TBTT of AP1.

The synchronous channel hopping illustrated in FIG. 7A is configured such that all data transfer time slots are approximately equal to one-half of the channel hopping base period. However, in other implementations, the time slots may be of different sizes.

For example, because communications may be more efficient on channel 2, time slots on channel 1 may be shorter than those on channel 2. Even with a channel-hopping period of three times the beacon interval of AP1, time slots on channel 1 can be less than the beacon interval, as long as the devices return to channel 1 according to schedule. Conversely, if channel 1 is less congested than channel 2, for example, time slots on channel 1 may be notably longer than time slots on channel 2.

As indicated above, the peer devices will quiesce not only when they switch to channel 1 close in time to a TBTT of AP1, but will also quiesce whenever they are on channel 1 (and actively communicating) and a TBTT approaches. Data transfer can resume if a beacon or other frame indicates the channel is clear, or if no beacon is received. If the channel is not clear, they cannot resume their transfer on channel 1. In this case they may alter the channel-hopping sequence to spend more time on channel 2, but periodically return to channel 1 (e.g., every third TBTT) to determine if the channel has become free, or take other action to continue their data transfer while being able to detect when channel 1 becomes available.

Figure 7B:
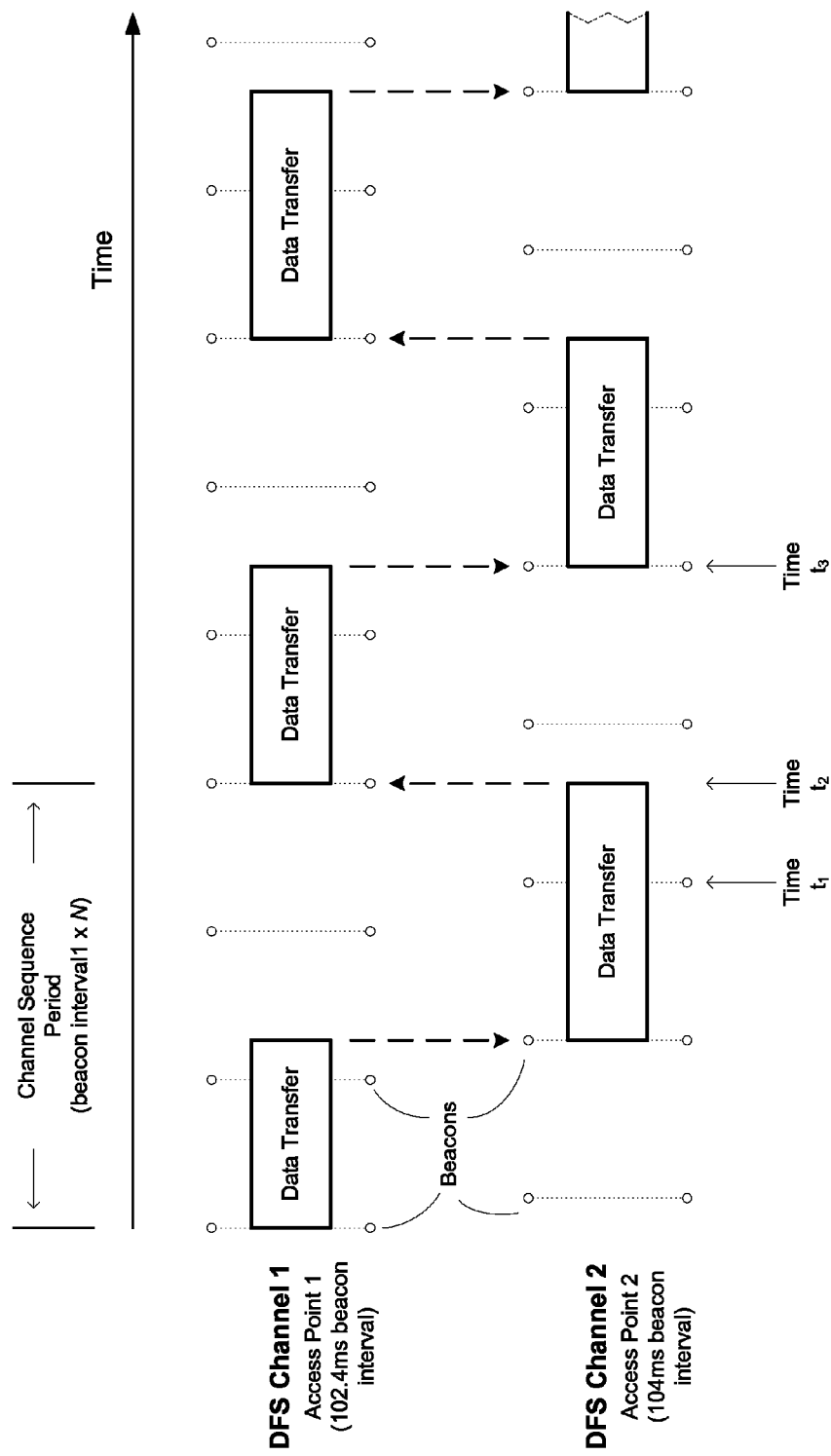
FIG. 7B depicts peer-to-peer channel-hopping communications on two restricted wireless channels, in accordance with some embodiments.

FIG. 7B depicts peer-to-peer channel-hopping communications on two restricted wireless channels, according to some embodiments. In these embodiments, the peer devices align their hops to channel 2 to coincide with target beacon transmission times of AP2, so that channel switch announcements (and/or other restriction messages) will be captured on both channels and illegal transmissions can be avoided.

In embodiments reflected in FIG. 7B, all channel switches are aligned with TBTTs of the destination channels and quiet periods are observed around every TBTT. Therefore, the likelihood of detecting a restriction message (e.g., a beacon with a channel switch announcement) is no worse than it would be if the devices were not communicating peer-to-peer on these channels.

In these embodiments, calculation of switching times is dynamic in order to not only accommodate the different beacon intervals, but also to allow for drift between the APs. Minimum dwell times may be implemented one channel, both channels, or neither channel (e.g., approximately one beacon interval). Because the channel hopping base period is 3 times the beacon interval of AP1 (i.e., N=3 in FIGS. 7A and 7B), and because both beacon intervals are very close in duration, the devices may dwell on each channel for at least a full beacon interval and will therefore almost certainly capture at least one beacon on each channel during each channel-hopping period.

To determine when to switch to the other channel in the embodiments of FIG. 7B, the peer devices record the time of the last beacon that they capture on each channel, and use that time to calculate future TBTTs on that same channel. These values will be used to determine when to switch back to that channel after switching away from it. An example of this is explained with reference to FIG. 7B.

The peer devices already track the TBTTs of channel 1, so that they know when each channel-hopping period begins/ends and they must switch back to channel 1 (e.g., at time $t_2$). Meanwhile, during the preceding time slot on channel 2, the devices note the time $t_1$ at which a beacon is issued on channel 2. Because they know the beacon interval of channel 2 (i.e., 104 ms), the devices can therefore calculate one or more future TBTTs of AP2 (e.g., the next two or three).

These times, when considered with time $t_2$, allow the devices to identify the correct or appropriate time $t_3$ at which to return to channel 2. Illustratively, the devices may select as the time to return to channel 2 the first TBTT that occurs after a default or minimum time period that follows $t_2$, so that the devices will dwell on channel 1 for a period of time sufficient to capture at least one TBTT. Illustratively, this period of time may be determined by the beacon interval of the channel, by a fixed value such as 100 ms, etc. As described above, channel switches may actually occur slightly before the TBTT of the destination channel.

Figure 8:
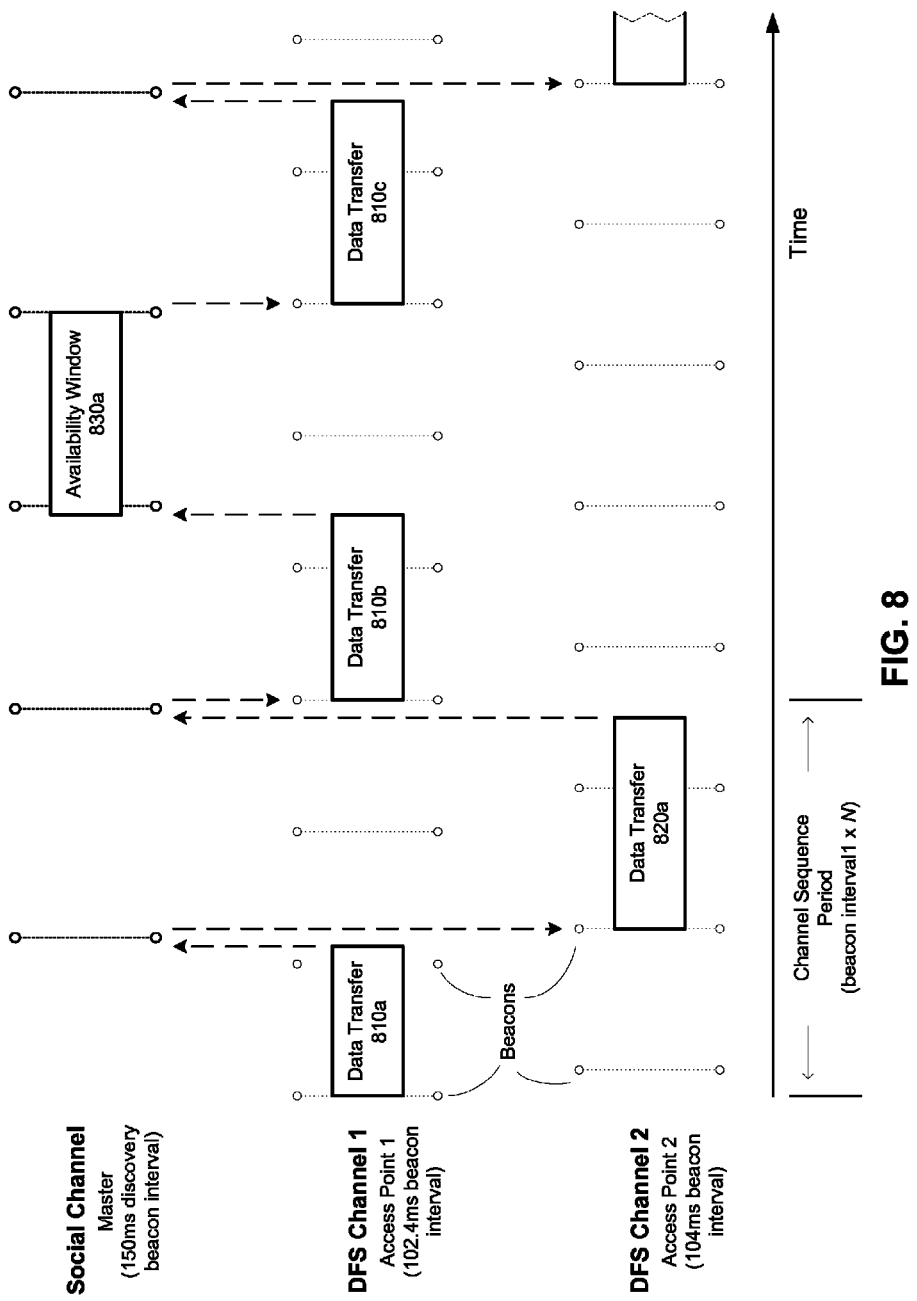
FIG. 8 depicts peer-to-peer channel-hopping communications among a social channel and one or more restricted channels, in accordance with some embodiments.

Regardless of the order and duration of their channel hops, the peer devices involved in the data transfer of FIG. 8 spend sufficient time on channels 1 and 2 to ensure they receive at least one beacon from each of AP1 and AP2 every couple or few seconds. Because clocks for typical devices (e.g., devices having Wi-Fi and/or Bluetooth capabilities) feature precisions on the order of +/−20 ppm from their nominal values, it is fairly easy for the devices to track the access points' beacon transmission clocks and to reliably predict future TBTTs, with accuracy within a few hundred microseconds.

Although the data transfer periods on restricted DFS channels are illustrated as uninterrupted boxes in FIGS. 7A and 7B, it will be understood that the data transfer that occurs during each period that includes a TBTT of the AP or DFS master will pause around the TBTT, as has been described.

In some embodiments, some or all devices conducting peer-to-peer communications on one or more restricted communication channels may be required to also spend time on a social channel (e.g., a separate channel being used to synchronize a cluster that includes the peer devices). Illustratively, a device may need to tune to a social channel to send or receive a discovery beacon (or synchronization beacon), or to attend an availability window (assuming that availability windows are conducted on a social channel). If availability windows are not conducted on the social channel, a device may also be required to periodically tune to a rendezvous channel to attend at least as many availability windows as indicated by its presence value.

Tending to these requirements will not divert a great deal of time from a device's direct peer-to-peer communication scheme. For example, to capture a regularly scheduled discovery beacon may require approximately 5-15 ms every 150 ms, while attending an availability window may require approximately 100-120 ms every 1 or 2 seconds.

In embodiments currently discussed, a social channel is never a restricted channel. Therefore, a peer device may tune to a social channel at an arbitrary time, which means attendance on a social channel can be synchronized with the beacon interval of an access point on some other channel (e.g., a restricted DFS channel on which the device is conducting peer-to-peer communications). However, when a device departs a social channel, it may tune to a restricted channel, in which case the time of that switch is not arbitrary (i.e., because the switch may be aligned with a TBTT of the restricted channel).

FIG. 8 depicts peer-to-peer channel-hopping communications among a social channel and one or more restricted channels, according to some embodiments.

These embodiments may be considered similar to embodiments depicted in FIG. 7B, in that a base channel-hopping period is calculated from the beacon interval of an access point of a restricted channel. In FIG. 8, as in FIG. 7B, the base channel-hopping period is 3 times the beacon interval of AP1; other base periods may be adopted in other embodiments. A cluster master (e.g., the anchor master, a branch master), which may be one of the peer devices, issues discovery beacons (or other beacons) on the social channel with an average period of approximately 150 ms.

The peer devices will dynamically calculate the length of each time slot to satisfy various objectives—including returning to channel 1 at the start of each period, synchronizing hops to all restricted channels with TBTTs on those channels, attending availability windows according to their presence values (the peer devices may adopt the same preference value to help them synchronize all channel switches), and issuing/catching as many beacons as possible on the social channel.

Thus, during each time slot, the devices may calculate one or more future channel switches, and priorities of any of the objectives enumerated above (and/or others), may affect the channel selections. Because every switch away from the social channel will be to a restricted channel (in the embodiments of FIG. 8), the ends of time slots on the social channel are not arbitrary.

In some embodiments, attending availability windows may have priority over most or even all other objectives—or at least attendance at availability window number 0 of each availability window sequence. As described in a previous section, all synchronized peer devices must attend this availability window; by doing so the peer devices are able to maintain synchronization and obtain current scheduling information.

In these embodiments, channel switches will be scheduled to ensure the peers attend at least those availability windows dictated by their preference values. Advantageously, if one of the peers involved in the channel-hopping data transfer of FIG. 8 is the anchor master responsible for setting the availability window schedule, that device may synchronize the availability windows with one or more other objectives.

In FIG. 8, data transfer 810a on channel 1 terminates at a time selected to allow the devices to tune to the social channel, issue/receive a beacon, and then switch to channel 2 just before the TBTT of AP2. Data transfer 820a on channel 2 is timed to end just before the next social channel beacon, so that the devices can switch to the social channel for the beacon and then return to channel 1 for data transfer 810b, at the start of the next channel-hopping sequence.

After data transfer 810b, the devices tune to the social channel to attend availability window 830a, during which a synchronization beacon may be sent (e.g., in place of a discovery beacon). After the availability window, the devices return to channel 1 for the next period, which starts with data transfer 810c, followed by another social channel beacon and then a switch to channel 2 for another data transfer slot.

As discussed in a previous section, discovery beacons issued on a social channel need not adhere to a rigid periodic schedule. Therefore, if the beacons issued on the social channel in FIG. 8 are being transmitted by one of the peers participating in the data transfer, those beacons can be flexibly and dynamically scheduled so as to provide at least a threshold density. For example, the channel hopping sequence may be designed as in FIG. 8 to transmit a discovery beacon on the social channel prior to each new channel-hopping sequence (i.e., just before returning to channel 1). Additional discovery beacons may be opportunistically scheduled to occur close in time to a hop to or from channel 2.

In some embodiments, time slots on the social channel that are scheduled to accommodate social channel beacons (and not availability windows) may be on the order of 10 ms—long enough to tune to the channel few milliseconds before the beacon time, transmit or receive the beacon, dwell a few milliseconds more, and then exit. Social channel time slots scheduled to accommodate availability windows are longer, depending on the minimum amount of time the devices must attend the window and/or other factors, and may be on the order of 150 ms to 200 ms.

If channel 2 was not a restricted channel, hops to channel 2 could be scheduled arbitrarily instead of having to be synchronized with AP2's TBTTs. Having an unrestricted (and non-social) channel in the channel-hopping sequence may increase the efficiency or throughput of the devices' data transfer in some situations. For example, although the TBTTs of AP1 and AP2 cannot be completely synchronized due to their different beacon intervals, there will be times during which they occur close in time to each other and during which a social channel beacon is scheduled to occur near the mid-point of the two APs' beacon intervals.

In the embodiments of FIG. 8 (i.e., wherein both data channels are restricted), this scenario may require the social channel beacon to be skipped, because if the devices tuned to the social channel for the beacon, they could not switch back for tens of milliseconds, until the next TBTT. With an unrestricted channel, however, the devices could switch to the social channel for the beacon, and then switch to the unrestricted channel to continue their data transfer. Alternatively, of course, the peer devices could perform an opportunistic data transfer on the social channel until they are able to return to a restricted channel close in time to a TBTT.

A Peer Device

Figure 9:
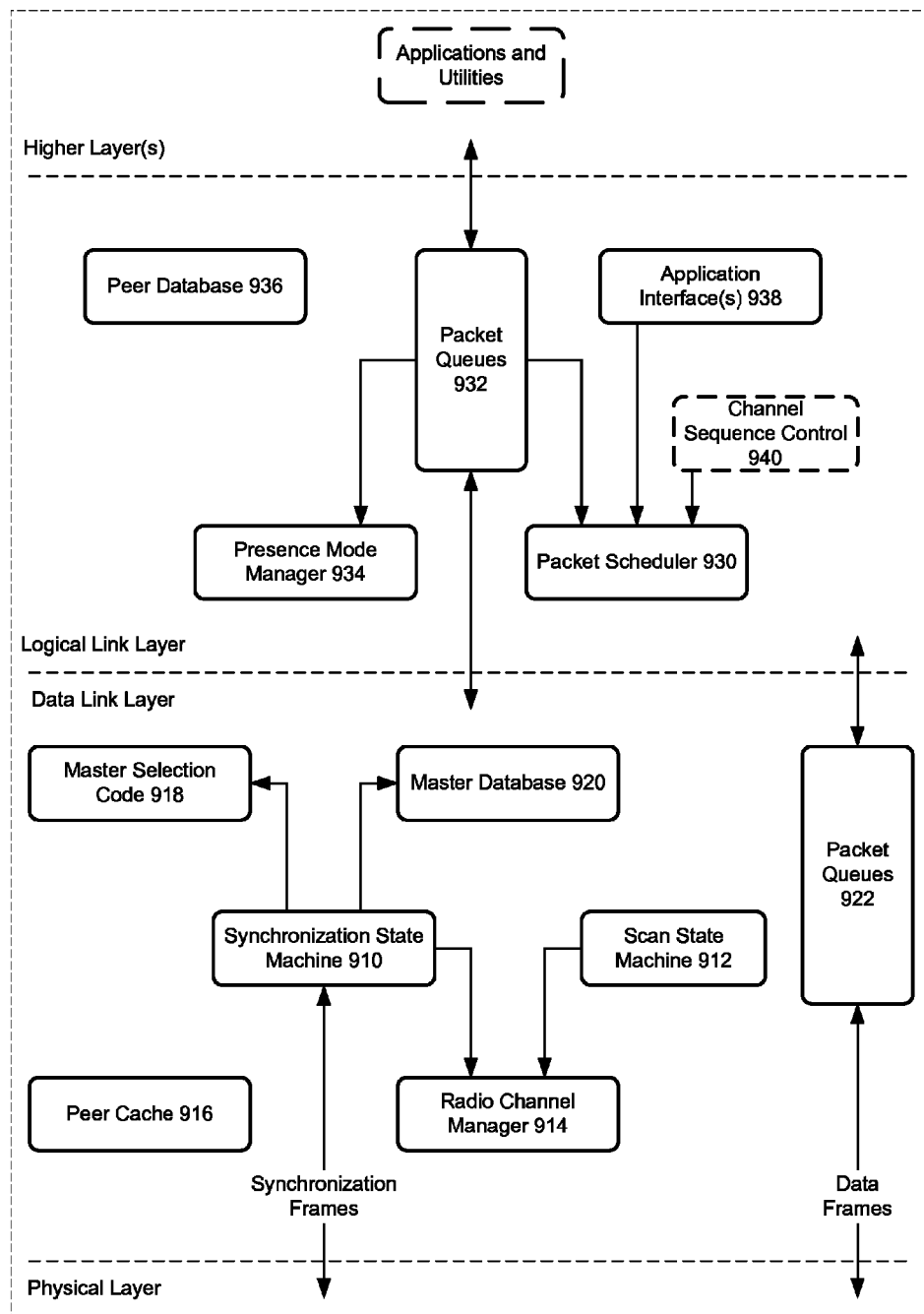
FIG. 9 is a block diagram of a peer communication device, according to some embodiments.

FIG. 9 is a block diagram of a peer communication device, according to some embodiments. Two primary protocol layers or operating layers are depicted within device 900—the Logical Link Layer and the Data Link Layer. Above the logical link layer one or more applications and/or utilities (e.g., mDNS, Bonjour) may operate; below the data link layer is the Physical Layer, responsible for transmitting frames over, and receiving frames from, the transmission medium.

In some embodiments, the logical link layer and data link layer may be physically implemented by separate processors or by integrated circuits residing on a single component. Some components of device 900 are omitted in the interest of clarity, such as processor, memory, display, antenna, and communication port components, among others.

Within the data link layer, synchronization frames (e.g., discovery beacons or DBs, synchronization beacons or SBs) are issued by and/or received by synchronization state machine 910. Incoming synchronization frames are routed to master database 920 and then passed upward to the logical link layer. Data frames are handled by packet queues 922.

Synchronization state machine 910 has two modes—master and non-master—and runs continuously in some implementations. As discussed earlier, a master device is a device that issues discovery beacons to facilitate device synchronization, while a non-master device may issue some type of beacon and may or may not solicit other devices to synchronize with it.

The synchronization state machine is responsible for synchronization of the peer device to its current master. If device 900 is a master, state machine 910 manages its transmission of discovery beacons and/or synchronization beacons, and also manages its availability window presence. Synchronization state machine 910 may also be responsible for calculating dwell times and switching times, such as when device 900 is engaged in a data transfer with another device while hopping among multiple channels.

Scan state machine 912 scans social channels for beacons. Radio channel manager 914 manages radio resources (e.g., a shared antenna) with other entities (e.g., an infrastructure module) and between different radios (e.g., Wi-Fi, Bluetooth). Synchronization state machine 910 interacts with radio channel manager 914 to switch the device's radio to the correct channel at the appropriate time for an availability window, a data transfer, to capture a beacon, and/or for other purposes. Scan state machine 912 and/or other components of device 900 may interact with the radio channel manager for other purposes (e.g., scanning a channel for new devices).

Peer cache 916 stores relevant information of a limited number of other devices with whom host peer device 900 is communicating or is about to communicate. Use of this cache may help alleviate problems associated with memory restrictions in some hardware/firmware implementations. For example, the data link layer may be implemented by a dedicated Wi-Fi chipset, which typically does not have access to large memory banks. Information in peer cache 916 is synchronized with information in peer database 936.

Master selection code 918 is periodically executed to perform a selection process for selecting or identifying master devices, using information from peer database 936 and/or other information. For example, execution of the code may cause a ranking of devices in master database 920, based on their suitability to be a master.

Master database 920 stores data regarding all masters that peer device 900 is aware of. Such data may be used for synchronization and/or master selection, and may include, but is not limited to, RSSI (Received Signal Strength Indication) (e.g., of the latest frame, average of multiple frames, minimum, maximum), master preference values, selection metrics used to calculate master preference values, cluster size, and synchronization parameters.

In some embodiments, master database 920 is populated or updated, and master selection code 918 executed, upon receipt of every discovery beacon.

Packet queues 922 of the data link layer store incoming and/or outgoing data frames. Packet queues 932 of the logical link layer store peer traffic incoming from, and outgoing to, other devices.

Packet scheduler 930 schedules multicast, broadcast, and unicast traffic to synchronized devices, and out-of-band inquiries/responses to masters with which the peer is not synchronized ("non-synchronized masters") and to devices synchronized with non-synchronized masters. The packet scheduler may also be responsible for selecting a sequence of channels for device 900 to switch to (e.g., to satisfy competing demands for the device's radio, to conduct a data transfer). Alternatively, a separate component such as optional channel sequence control 940 may be implemented to identify a sequence of channels for the device.

Peer database 936 stores information regarding the non-synchronized masters' availability windows, presence modes, and other timing-related information. Presence mode manager 934 controls the peer device's presence mode, based on factors that may include, but that are not limited to: current active data links to synchronized devices, current data rates to those devices, scan requirements, out-of-band inquiry requirements, power management state, Bluetooth requirements, other radio requirements, etc.

Peer database 936 identifies all devices known to peer device 900, and stores information regarding each device. This information may include, but is not limited to, its identity (e.g., network address), its anchor master's identity, master preference value, capabilities (e.g., supported frequency bands, channel bandwidths, modulation/data rates), presence mode, services supported by the device, outstanding block ACK agreements, and so on. Peer database 936 may thus assist in a master selection process by providing a list of candidate devices that can be ordered by preference value and/or other criteria.

Application interface(s) 938 include interfaces to higher system layers and modules, which may include but are not limited to: configuration and network management, a GUI (Graphical User Interface), service advertisement and discovery, and so on. The GUI may present a device user with a list of surrounding peers, their physical proximities, range or signal strengths, lists of their service, and/or other information.

The configuration of peer device 900 presented in FIG. 9 is exemplary. In other embodiments a peer device's configuration may differ to varying degrees. For example, functions of the components of device 900 may be combined in a different manner, those of a single component may be subdivided, and/or those of multiple components may be merged.

In some embodiments, a peer device includes an application processor to support applications (e.g., the applications and utilities residing in higher layers in device 900). The application processor provides memory management, graphics processing and/or other functions needed by the applications. The peer device in some embodiments also includes a wireless interface, such as a baseband processor, for performing wireless communications, along with corresponding memory and a transceiver for supporting the wireless communications and communications processing.

The wireless interface may include all of the components depicted in the logical link layer and data link layers of FIG. 9 and the functionality described in conjunction with those components. The wireless interface may also handle some tasks normally associated with the physical layer (e.g., channel coding).

Thus, in some embodiments, a "communication module" or "wireless communication module" of a peer device may refer to a robust wireless interface component described immediately above. In some other embodiments, a communication module may encompass a baseband processor and a corresponding wireless transceiver for operating or managing an antenna of the device, and possibly memory used by the baseband processor. In yet other embodiments, a communication module may encompass the components of the logical link layer and data link layer of device 900, and other components necessary to transmit and receive data to and from the peer device.

An environment in which some embodiments described above are executed may incorporate a general-purpose computer or a special-purpose device such as a hand-held computer, smart phone, or other mobile device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory, non-volatile memory, magnetic and optical storage devices such as disk drives, magnetic tape, CDs (compact discs) and DVDs (digital versatile discs or digital video discs), solid-state drives and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed.

When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A device for conducting peer-to-peer communications, the device comprising:
    a processor communicatively coupled to a wireless transceiver; and
    a memory;
    wherein the processor and the wireless transceiver are configured to:
    determine a target beacon transmission time (TBTT) of a restricted channel;
    align, based at least in part on the TBTT of the restricted channel, a channel-hopping sequence with the TBTT of the restricted channel, wherein the restricted channel comprises a channel requiring deference to a preferred signal source or signal type when communication on the restricted channel would otherwise interfere with the preferred signal source or signal type;
    tune to the restricted channel prior to the TBTT;
    refrain from transmitting on the restricted channel during an interval of time that includes the TBTT; and
    transmit on the restricted channel after the interval of time that includes the TBTT responsive to (i) receiving a beacon or a management frame indicating the restricted channel is clear or (ii) determining that a beacon or a management frame was not received during the interval of time that includes the TBTT.

2. The device of claim 1, wherein:
    the memory is configured to store identities of frequencies of multiple channels, including the restricted channel; and
    the processor and the wireless transceiver are further configured to hop among the multiple channels in the channel-hopping sequence while conducting the peer-to-peer communications.

3. The device of claim 2, wherein the channel-hopping sequence has a period equivalent to a multiple of a beacon interval of a central code operating on the restricted channel.

4. A method of conducting peer-to-peer communications, the method comprising:
    calculating a channel-hopping sequence for communication channels on which to conduct the peer-to-peer communications, wherein the communication channels comprise a restricted channel on which a first master device issues beacon frames with a beacon interval, and the calculating aligns, based at least in part on a target beacon transmission time (TBTT1) of the restricted channel, the channel-hopping sequence with the TBTT1 of the restricted channel;
    tuning to the restricted channel, wherein the restricted channel comprises a channel requiring a device to leave the restricted channel when a preferred signal source or signal type is detected on the restricted channel;
    refraining from transmitting on the restricted channel for a period of time encompassing the TBTT1; and
    transmitting the peer-to-peer communications on the restricted channel after the period of time that includes the TBTT1 responsive to (i) receiving a beacon frame indicating that the restricted channel is free or (ii) determining that a beacon frame was not received during the period of time that includes the TBTT1.

5. The method of claim 4, further comprising hopping among the channel-hopping sequence of the communication channels, wherein the hopping comprises:
    calculating a period of the channel-hopping sequence, wherein the period is approximately equal to a multiple of the beacon interval;
    calculating a time to tune to another unrestricted channel from the restricted channel; and
    tuning to the restricted channel for a next hopping period.

6. The method of claim 5, wherein the calculating the time to tune to the another unrestricted channel from the restricted channel comprises calculating fixed-length time slots for the peer-to-peer communications on the restricted channel and the another unrestricted channel.

7. The method of claim 5, wherein the calculating the time to tune to the another restricted channel from the restricted channel comprises:
    identifying another beacon interval with which another master device issues beacon frames on the another restricted channel;
    based at least in part on the another beacon interval, calculating another target beacon transmission time (TBTT2); and
    selecting a time prior to the TBTT2 to tune to the second restricted channel.

8. A non-transitory computer-readable medium storing instructions that, when executed by a processor, cause the processor to perform a method of conducting peer-to-peer communications, the method comprising:
    calculating a channel-hopping sequence for communication channels on which to conduct the peer-to-peer communications, wherein the communication channels comprise a restricted channel on which a master device issues beacon frames with a beacon interval, and the calculating aligns, based at least in part on a target beacon transmission time (TBTT1) of the restricted channel, the channel-hopping sequence with the TBTT1 of the restricted channel;
    tuning to the restricted channel, wherein the restricted channel comprises a channel requiring a device to leave the restricted channel when a preferred signal source or signal type is detected on the restricted channel;
    refraining from transmitting on the restricted channel for a period of time encompassing the TBTT1; and
    transmitting the peer-to-peer communications on the restricted channel after the period of time that includes the TBTT1 responsive to receiving a beacon frame indicating that the restricted channel is free.

9. The non-transitory computer-readable medium of claim 8, wherein the method further comprises hopping among the channel-hopping sequence of the communication channels, the hopping comprises:
    calculating a period of the channel-hopping sequence, wherein the period is approximately equal to a multiple of the beacon interval;
    calculating a time to tune to another unrestricted channel from the restricted channel; and
    tuning to the restricted channel for a next hopping period, wherein the calculating the time to tune to the unrestricted channel from the restricted channel comprises calculating fixed-length time slots for the peer-to-peer communications on the restricted channel and the another unrestricted channel.

10. The non-transitory computer-readable medium of claim 8, wherein the method further comprises hopping among the channel-hopping sequence of the communication channels, wherein the hopping comprises:
  calculating a period of the channel-hopping sequence, wherein the period is approximately equal to a multiple of the beacon interval;
  calculating a time to tune to another unrestricted channel from the restricted channel; and
  tuning to the restricted channel for a next hopping period, wherein the calculating the time to tune to the another restricted channel from the restricted channel comprises:
    identifying another beacon interval with which another master device issues beacon frames on the another restricted channel;
    based at least in part on the another beacon interval, calculating another target beacon transmission time (TBTT2); and
    selecting a time prior to the TBTT2 to tune to the another restricted channel.

11. A method of conducting peer-to-peer communications at a peer device, the method comprising:
  identifying two or more communication channels on which to conduct the peer-to-peer communications, wherein at least one of the two or more communication channels comprises a restricted channel requiring the peer device to leave the restricted channel when a preferred signal source or signal type is detected on the restricted channel;
  based at least in part on a beacon interval of the at least one communication channel, selecting a time period for conducting multiple channel-hopping sequences among the two or more channels;
  upon a first hop to the at least one communication channel, postponing transmission on the at least one communication channel until a communication from a management node indicates the at least one communication channel is free;
  upon a subsequent hop to the at least one of the communication channel, postponing transmission on the at least one communication channel until a window of time of a predetermined duration passes during which no communication is received from the management node; and
  timing a switch to a social channel to coincide with one of:
    a peer-to-peer beacon on the social channel for maintaining synchronization with a cluster of other peer-to-peer devices; and
    an availability window on the social channel for discovering other peer devices in the cluster.

12. The method of claim 11, further comprising, after postponing from transmitting on the at least one communication channel:
  resuming the peer-to-peer communications; and
  repeating said postponing before a Target Beacon Transmission Time (TBTT) of the management node.

13. The method of claim 11, further comprising:
  timing a switch to an other communication channel of the two or more communication channels to occur at an arbitrary time; and
  resuming the peer-to-peer communications upon switching to the other communication channel.

14. The method of claim 11, wherein:
  the management node comprises an access point associated with one or more peer devices other than the peer device;
  the peer device is associated with another management node operating on another communication channel; and
  the method further comprises:
    complying with a channel switch announcement issued by the management node.

15. The method of claim 11, further comprising:
  synchronizing a schedule of availability windows on the social channel.

16. The method of claim 11, wherein the predetermined duration is approximately 10 ms.

17. The method of claim 11, wherein:
  DFS (Dynamic Frequency Selection) is required on the at least one communication channel; and
  the management node comprises a DFS master.

18. The device of claim 2, wherein the processor and the wireless transceiver are further configured to:
  modify a channel sequence period of the channel-hopping sequence based at least in part on the TBTT, wherein the modified channel sequence period ends prior to the TBTT; and
  tune to the restricted channel based at least in part on the modified channel sequence period.

19. The device of claim 18, wherein the processor and the wireless transceiver are further configured to:
  determine an other TBTT on an other restricted channel; and
  modify the channel sequence period of the channel-hopping sequence based at least in part on the other TBTT.

* * * * *